United States Patent
Levitsky et al.

(10) Patent No.: US 12,244,380 B2
(45) Date of Patent: Mar. 4, 2025

(54) TRANSMISSION MODE-BASED INDICATIONS OF PREFERRED CONFIGURATIONS OF DEMODULATION REFERENCE SIGNALS

(71) Applicant: QUALCOMM Incorporated, San Diego, CA (US)

(72) Inventors: Michael Levitsky, Rehovot (IL); Muhammad Sayed Khairy Abdelghaffar, San Jose, CA (US); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/448,852

(22) Filed: Sep. 24, 2021

(65) Prior Publication Data

US 2023/0096382 A1 Mar. 30, 2023

(51) Int. Cl.
| | |
|---|---|
| *H04B 7/06* | (2006.01) |
| *H04B 7/01* | (2006.01) |
| *H04B 17/336* | (2015.01) |
| *H04L 5/00* | (2006.01) |
| *H04W 24/00* | (2009.01) |

(52) U.S. Cl.
CPC ............ *H04B 7/0626* (2013.01); *H04B 7/01* (2013.01); *H04B 17/336* (2015.01); *H04L 5/0051* (2013.01)

(58) Field of Classification Search
CPC ...... H04B 7/0626; H04B 17/336; H04B 7/01; H04L 5/0051
USPC .......................................................... 370/329
See application file for complete search history.

(56) References Cited

U.S. PATENT DOCUMENTS

| | | | |
|---|---|---|---|
| 2010/0232384 A1* | 9/2010 | Farajidana | H04L 25/0204 370/329 |
| 2015/0282123 A1* | 10/2015 | Miao | H04W 48/00 455/450 |
| 2018/0295637 A1* | 10/2018 | Manolakos | H04L 5/0048 |
| 2019/0141693 A1* | 5/2019 | Guo | H04B 7/0695 |
| 2019/0356378 A1* | 11/2019 | Takeda | H01Q 25/00 |
| 2020/0395988 A1* | 12/2020 | Lee | H04L 5/0057 |
| 2020/0396047 A1* | 12/2020 | Gao | H04L 5/0051 |
| 2021/0091841 A1* | 3/2021 | Lindbom | H04L 5/0016 |
| 2022/0330068 A1* | 10/2022 | Yuan | H04B 7/063 |

* cited by examiner

*Primary Examiner* — Xuan Lu
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive one or more reference signals associated with a downlink communication. The UE may transmit an indication of a preferred demodulation reference signal (DMRS) configuration to be used for the downlink communication, the preferred DMRS configuration based at least in part on the one or more reference signals and a transmission mode associated with the preferred DMRS configuration. Numerous other aspects are described.

30 Claims, 12 Drawing Sheets

TRANSMISSION MODE-BASED INDICATIONS OF PREFERRED CONFIGURATIONS OF DEMODULATION REFERENCE SIGNALS

FIELD OF THE DISCLOSURE

Aspects of the present disclosure generally relate to wireless communication and to techniques and apparatuses for transmission mode-based indications of preferred configurations of demodulation reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more reference signals associated with a downlink communication. The method may include transmitting an indication of a preferred demodulation reference signal (DMRS) configuration to be used for the downlink communication, the preferred DMRS configuration based at least in part on the one or more reference signals and a transmission mode associated with the preferred DMRS configuration.

Some aspects described herein relate to a method of wireless communication performed by a base station. The method may include transmitting one or more reference signals associated with a downlink communication. The method may include receiving an indication of a preferred DMRS configuration to be used for the downlink communication, the preferred DMRS configuration based at least in part on the one or more reference signals and a transmission mode associated with the preferred DMRS configuration.

Some aspects described herein relate to a UE for wireless communication. The user equipment may include a memory and one or more processors coupled to the memory. The one or more processors may be configured to receive one or more reference signals associated with a downlink communication. The one or more processors may be configured to transmit an indication of a preferred DMRS configuration to be used for the downlink communication, the preferred DMRS configuration based at least in part on the one or more reference signals and a transmission mode associated with the preferred DMRS configuration.

Some aspects described herein relate to a base station for wireless communication. The base station may include a memory and one or more processors coupled to the memory. The one or more processors may be configured to transmit one or more reference signals associated with a downlink communication. The one or more processors may be configured to receive an indication of a preferred DMRS configuration to be used for the downlink communication, the preferred DMRS configuration based at least in part on the one or more reference signals and a transmission mode associated with the preferred DMRS configuration.

Some aspects described herein relate to an apparatus for wireless communication. The apparatus may include means for receiving one or more reference signals associated with a downlink communication. The apparatus may include means for transmitting an indication of a preferred DMRS configuration to be used for the downlink communication, the preferred DMRS configuration based at least in part on the one or more reference signals and a transmission mode associated with the preferred DMRS configuration.

Some aspects described herein relate to an apparatus for wireless communication. The apparatus may include means for transmitting one or more reference signals associated with a downlink communication. The apparatus may include means for receiving an indication of a preferred DMRS configuration to be used for the downlink communication, the preferred DMRS configuration based at least in part on the one or more reference signals and a transmission mode associated with the preferred DMRS configuration.

Some aspects described herein relate to a non-transitory computer-readable medium that stores a set of instructions for wireless communication by a UE. The set of instructions, when executed by one or more processors of the UE, may cause the UE to receive one or more reference signals associated with a downlink communication. The set of instructions, when executed by one or more processors of the UE, may cause the UE to transmit an indication of a preferred DMRS configuration to be used for the downlink communication, the preferred DMRS configuration based at least in part on the one or more reference signals and a transmission mode associated with the preferred DMRS configuration.

Some aspects described herein relate to a non-transitory computer-readable medium that stores a set of instructions for wireless communication by a base station. The set of instructions, when executed by one or more processors of the base station, may cause the base station to transmit one or more reference signals associated with a downlink communication. The set of instructions, when executed by one or more processors of the base station, may cause the base station to receive an indication of a preferred DMRS configuration to be used for the downlink communication, the preferred DMRS configuration based at least in part on the one or more reference signals and a transmission mode associated with the preferred DMRS configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
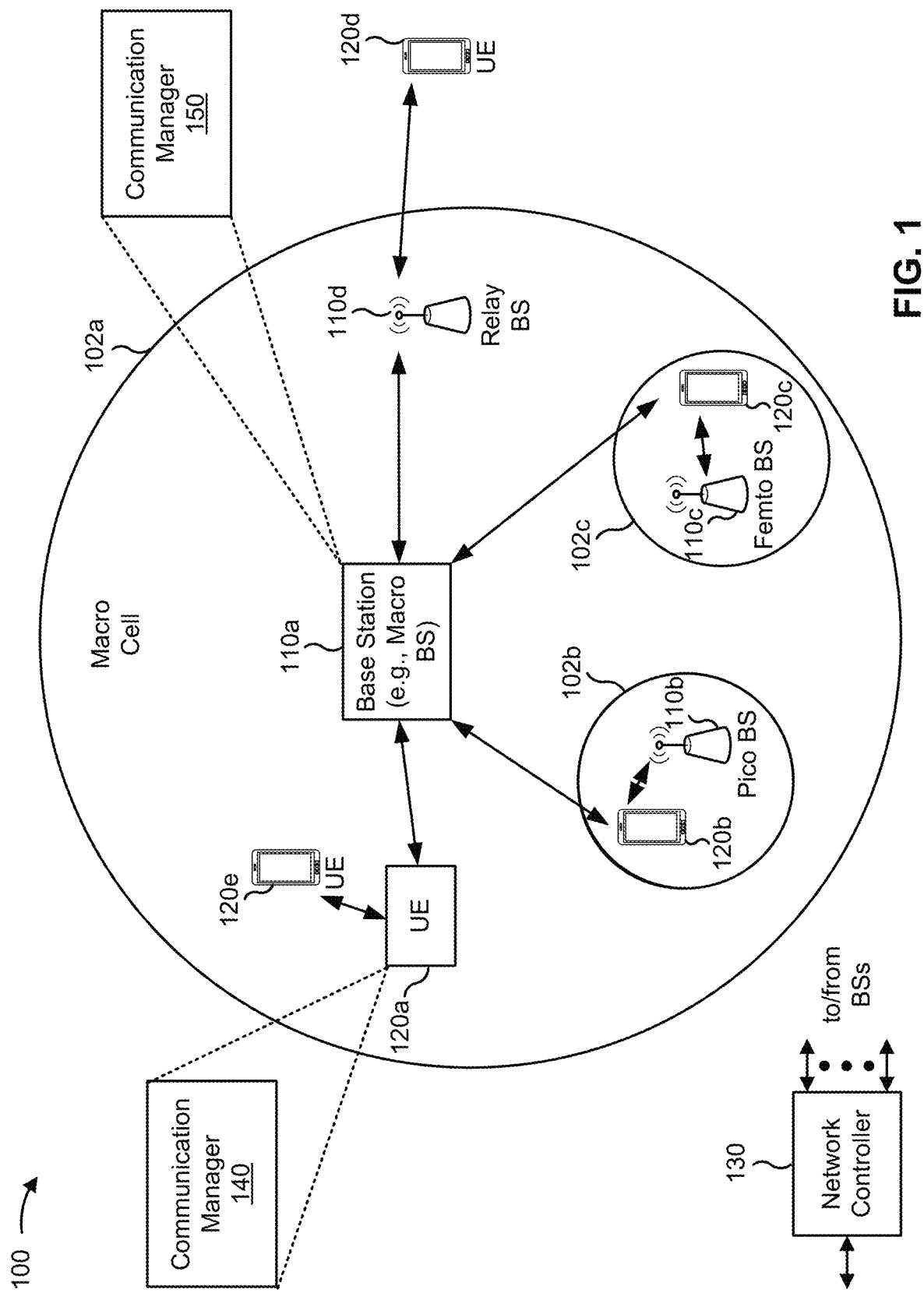
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more reference signals associated with a downlink communication; and transmit an indication of a preferred DMRS configuration to be used for the downlink communication, the preferred DMRS configuration based at least in part on the one or more reference signals and a transmission mode associated with the preferred DMRS configuration. Additionally, or alternatively, the communication manager 140 may perform one or more other operations described herein.

In some aspects, the base station 110 may include a communication manager 150. As described in more detail elsewhere herein, the communication manager 150 may transmit one or more reference signals associated with a downlink communication; and receive an indication of a preferred DMRS configuration to be used for the downlink communication, the preferred DMRS configuration based at least in part on the one or more reference signals and a transmission mode associated with the preferred DMRS configuration. Additionally, or alternatively, the communication manager 150 may perform one or more other operations described herein.

As indicated above, FIG. 1 is provided as an example. Other examples may differ from what is described with regard to FIG. 1.

Figure 2:
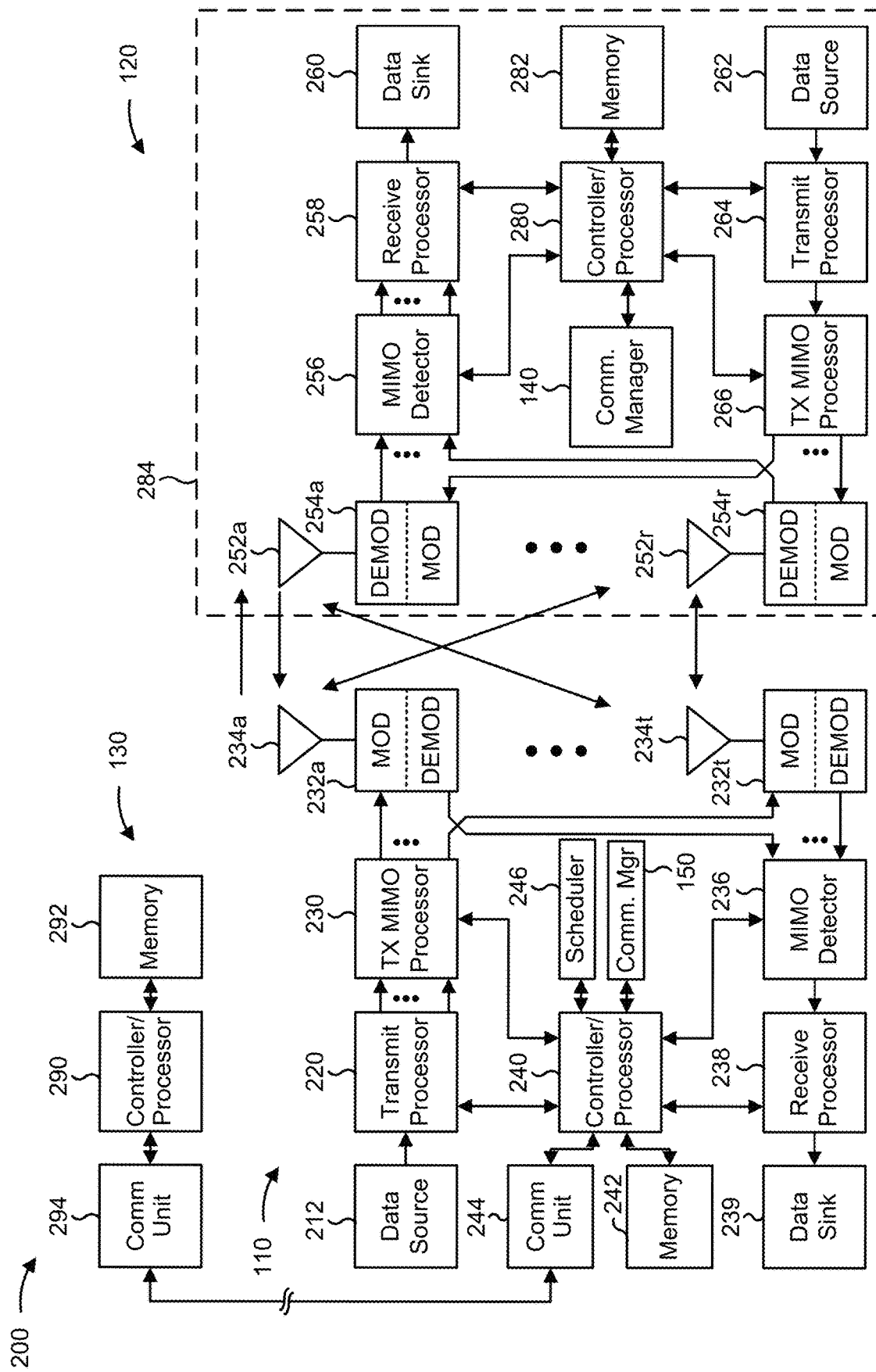
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with transmission mode-based indications of preferred configurations of demodulation reference signals, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving one or more reference signals associated with a downlink communication; and/or means for transmitting an indication of a preferred DMRS configuration to be used for the downlink communication, the preferred DMRS configuration based at least in part on the one or more reference signals and a transmission mode associated with the preferred DMRS configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting one or more reference signals associated with a downlink communication; and/or means for receiving an indication of a preferred DMRS configuration to be used for the downlink communication, the preferred DMRS configuration based at least in part on the one or more reference signals and a transmission mode associated with the preferred DMRS configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
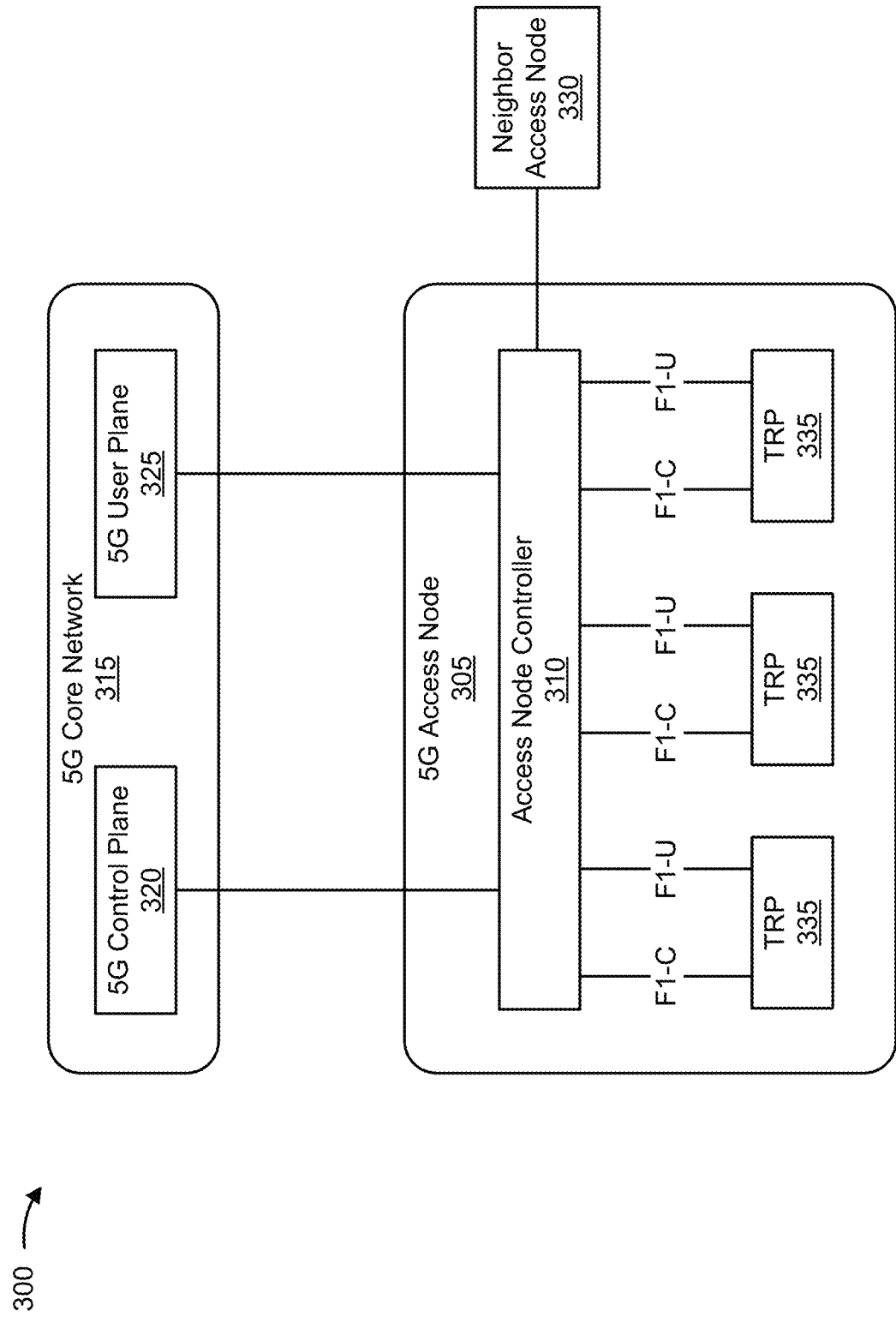
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some networks, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some networks, a TRP 335 may correspond to a base station 110 described above in connection with FIG. 1. For example, different TRPs 335 may be included in different base stations 110. Additionally, or alternatively, multiple TRPs 335 may be included in a single base station 110. In some networks, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some networks, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some networks, multiple TRPs 335 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some networks, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

In some networks, the distributed RAN 300 may be configured to provide connections to UEs traveling at high speeds. In some networks, the distributed RAN 300 may provide connections to UEs in a high speed train environment (HST) environment. The distributed RAN may operate using one or more of a set of candidate transmission modes, such as a multi-TRP mode, a single TRP mode, a single frequency network (SFN) mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single TCI state mode, a multiple TCI states mode, and/or a mode including two or more modes.

As indicated above, FIG. 3 is provided as an example. Other examples may differ from what was described with regard to FIG. 3.

Figure 4:
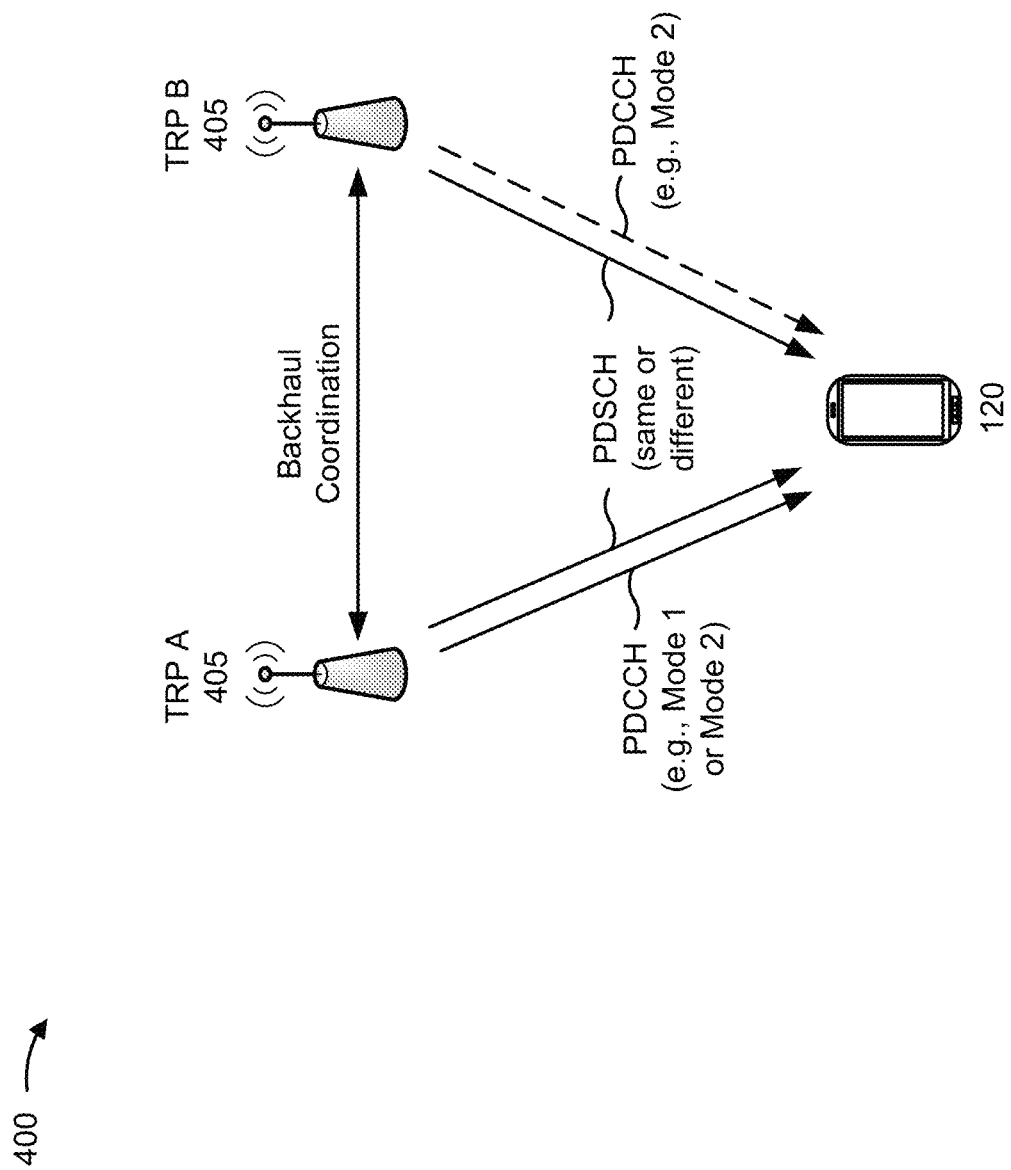
FIG. 4 is a diagram illustrating an example of multi-transmission reception point (TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different DMRS ports, different DMRS configurations and/or different layers (e.g., of a multi-layer communication).

In a first multi-TRP transmission mode (e.g., Mode 1 and/or a single DCI based multi-TRP scheduling mode, among other examples), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some networks, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In some networks, different TRPs may have different DMRS configurations. For example, a first TRP may have a first DMRS configuration and a second TRP may have a second DMRS configuration based at least in part on the first TRP and the second TRP being associated with a different, non-overlapping set of DMRS groups and/or a different, non-overlapping set of code division multiplexing (CDM) groups. The different DMRS configurations may be used for a non-SFN DMRS, where each port may be transmitted only by a specific TRP on a dedicated CDM group. In this way, the different TRPs may transmit downlink communications simultaneously to the UE using different DMRS configurations.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

In some networks, the first TRP and the second TRP may communicate with the UE 120 using a transmission mode, such as a transmission mode described in connection with FIGS. 5A-5E.

As indicated above, FIG. 4 is provided as an example. Other examples may differ from what is described with respect to FIG. 4.

FIGS. 5A-5E are diagrams illustrating examples 500A-500E of multi-TRP transmission modes, in accordance with the present disclosure. In some networks, the UE may be configured to communicate with a base station via multiple TRPs (e.g., a first TRP and a second TRP) that are not co-located and that have spatial diversity with respect to the UE.

Figure 5A:
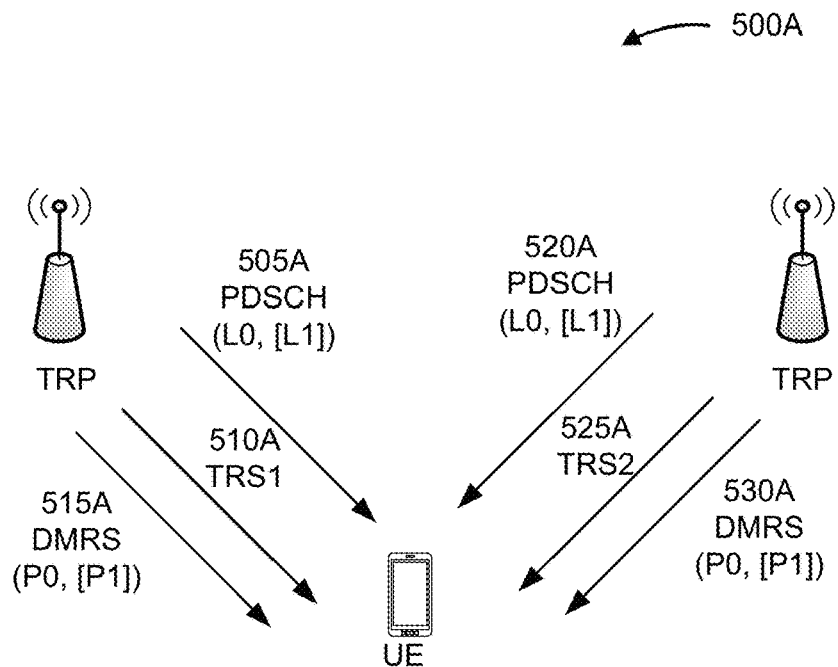
FIGS. 5A-5E are diagrams illustrating examples of multi-TRP transmission modes, in accordance with the present disclosure.

As shown in FIG. 5A, the example 500A of a transmission mode may include a first TRP configured to transmit, to the UE, a first PDSCH communication 505A (e.g., a first TRP portion of a single PDSCH communication), a first tracking reference signal (TRS1) 510A, and/or a first DMRS 515A (e.g., a first TRP DMRS). The first PDSCH communication 505A may include at least one layer (L0 and/or L1). The first DMRS 515A may be associated with at least one code division multiplexing (CDM) group (for example DMRS ports P0 and/or P1).

As further shown in FIG. 5A, the transmission mode may include a second TRP configured to transmit, to the UE, a second PDSCH communication 520A (e.g., a second TRP portion of the single PDSCH communication), a second tracking reference signal (TRS2) 525A, and/or a second DMRS 530A (e.g., a second TRP DMRS). The second PDSCH communication 520A may use the same at least one layer (L0 and/or L1) used by the first PDSCH communication 505A. In some aspects, the first PDSCH communication 505A and the second PDSCH communication 520A may include a same transport block (e.g., same data) and a same codeword. The second tracking reference signal 525A may be different from the first tracking reference signal 510A. The second DMRS 530A may be associated with the same at least one CDM group (P0 and/or P1 DMRS ports) used by the first DMRS 515A. The first DMRS 510A and the second DMRS 530A may be a same DMRS using same DMRS ports.

The example 500A of the transmission mode may include an SFN-based PDSCH, an SFN-based DMRS, a non-SFN-based TRS and different TCIs addressed jointly under a special QCL type.

Figure 5B:
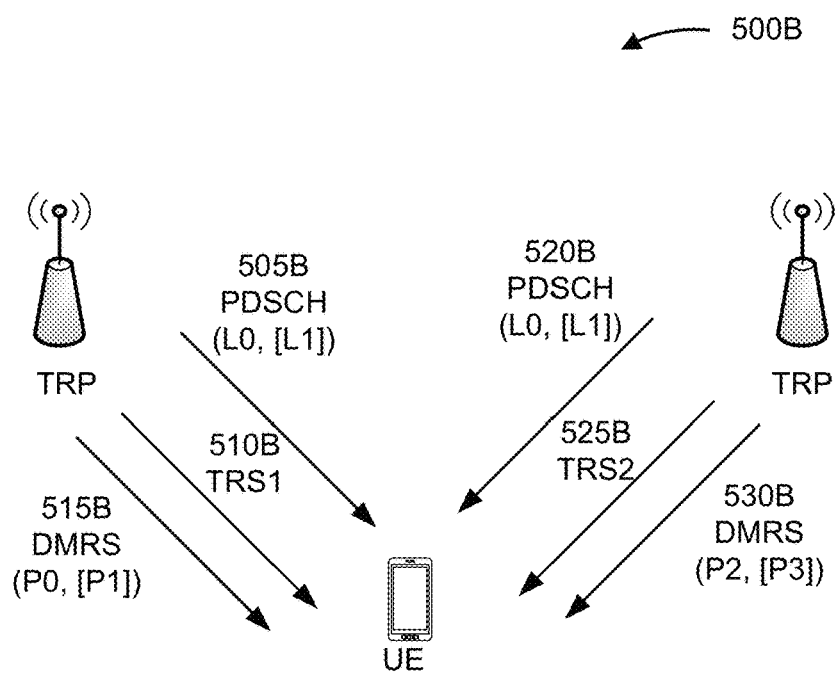

As shown in FIG. 5B, the example 500B of a transmission mode may include a first TRP configured to transmit, to the UE, a first PDSCH communication 505B (e.g., a first TRP portion of a single PDSCH communication), a first tracking reference signal (TRS1) 510B, and/or a first DMRS 515B. The first PDSCH communication 505B may include at least one layer (L0 and/or L1). The first DMRS 515B may be associated with one of the CDM groups (e.g., with DMRS ports P0 and/or P1).

As further shown in FIG. 5B, the transmission mode may include a second TRP configured to transmit, to the UE, a second PDSCH communication 520B (e.g., a second TRP portion of the single PDSCH communication), a second tracking reference signal (TRS2) 525B, and/or a second DMRS 530B (e.g., a second TRP DMRS). The second PDSCH communication 520B may use the same at least one layer (L0 and/or L1) used by the first PDSCH communication 505B. In some examples, the first PDSCH communication 505A and the second PDSCH communication 520A may include a same transport block (e.g., same data) and a same codeword. The second tracking reference signal 525B may be different from the first tracking reference signal 510B. The second DMRS 530B may be associated with a different CDM group than the one associated with DMRS of the first TRP (e.g., P2 and/or P3 DMRS ports can be associated with the second TRP).

The example 500B of the transmission mode may include an SFN-based PDSCH, a non-SFN-based DMRS, a non-SFN-based TRS and different TCIs.

Figure 5C:
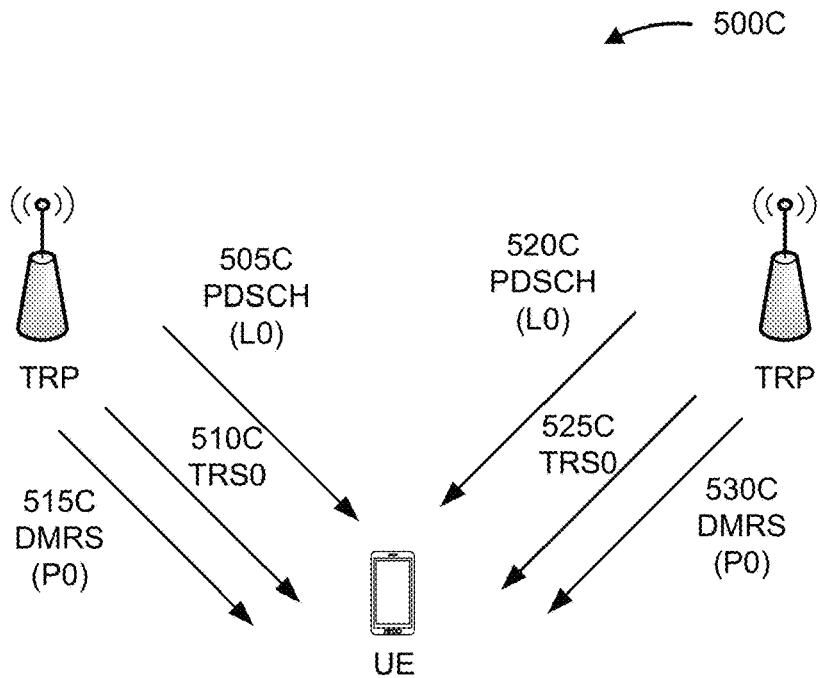

As shown in FIG. 5C, the example 500C of a transmission mode may include a first TRP configured to transmit, to the UE, a first PDSCH communication 505C (e.g., a first TRP portion of a single PDSCH communication), a first tracking reference signal (TRS0) 510C, and/or a first DMRS 515C. The first PDSCH communication 505C may include one layer (L0). The first DMRS 515C may be associated with a CDM group (e.g., DMRS port P0).

As further shown in FIG. 5C, the transmission mode may include a second TRP configured to transmit, to the UE, a second PDSCH communication 520C (e.g., a second TRP portion of the single PDSCH communication), a second tracking reference signal (TRS0) 525C (e.g., a second TRP portion of the single TRS communication), and/or a second DMRS 530C (e.g., a second TRP portion of the single DMRS). The second PDSCH communication 520C may use the same layer (L0) used by the first PDSCH communication 505C. In some examples, the first PDSCH communication 505C and the second PDSCH communication 520C may include a same transport block (e.g., same data) and a same codeword. The second tracking reference signal 525C transmitted by the second TRP may be the same as the first tracking reference signal 510C. The second DMRS 530C transmitted by the second TRP may be associated with the same CDM group and the same DMRS port (e.g., P0) that is used by the first TRP.

The example 500C of the transmission mode may include a transparent SFN (e.g., SFN-based PDSCH, an SFN-based DMRS, an SFN-based TRS and a single TCI).

Figure 5D:
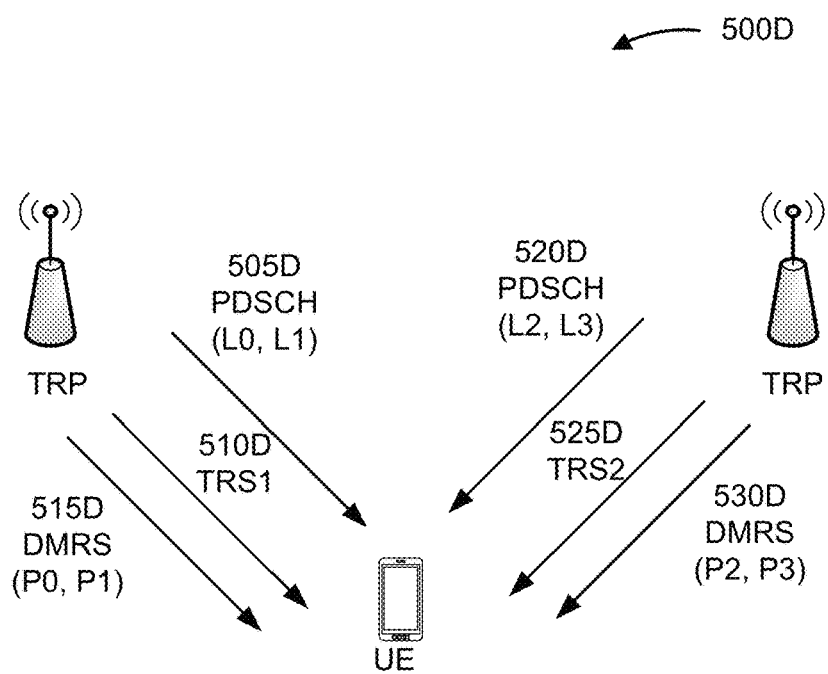

As shown in FIG. 5D, the example 500D of a transmission mode may include a first TRP configured to transmit, to the UE, a first PDSCH communication 505D (e.g., a first TRP portion of a single PDSCH communication), a first tracking reference signal (TRS1) 510D, and/or a first DMRS 515D. The first PDSCH communication 505D may include at least one layer (L0 and/or L1). The first DMRS 515D may be associated with at least one CDM group (e.g., with DMRS ports P0 and/or P1).

As further shown in FIG. 5D, the transmission mode may include a second TRP configured to transmit, to the UE, a second PDSCH communication 520D (e.g., a second TRP portion of the single PDSCH communication), a second tracking reference signal (TRS2) 525D, and/or a second DMRS 530D (e.g., a different DMRS than the first DMRS 515D). The second PDSCH communication 520D may use different layers (L2 and/or L3) than the at least one layer (L0 and/or L1) used by the first PDSCH communication 505D. In some examples, the first PDSCH communication 505D and the second PDSCH communication 520D may include a same transport block (e.g., same data) and a same codeword. The second tracking reference signal (TRS2) 525D may be different from the first tracking reference signal 510D. The second DMRS 530D may be associated with at least one CDM group with DMRS ports P2 and/or P3 that are different from the at least one CDM group with DMRS ports P0 and/or P1 used by the first DMRS 515D.

The example 500D of the transmission mode may include a spatial division multiplexing (SDM)-based configuration that includes a multiple-TRP PDSCH, a non-SFN-based DMRS, a non-SFN-based TRS, and different TCIs.

Figure 5E:
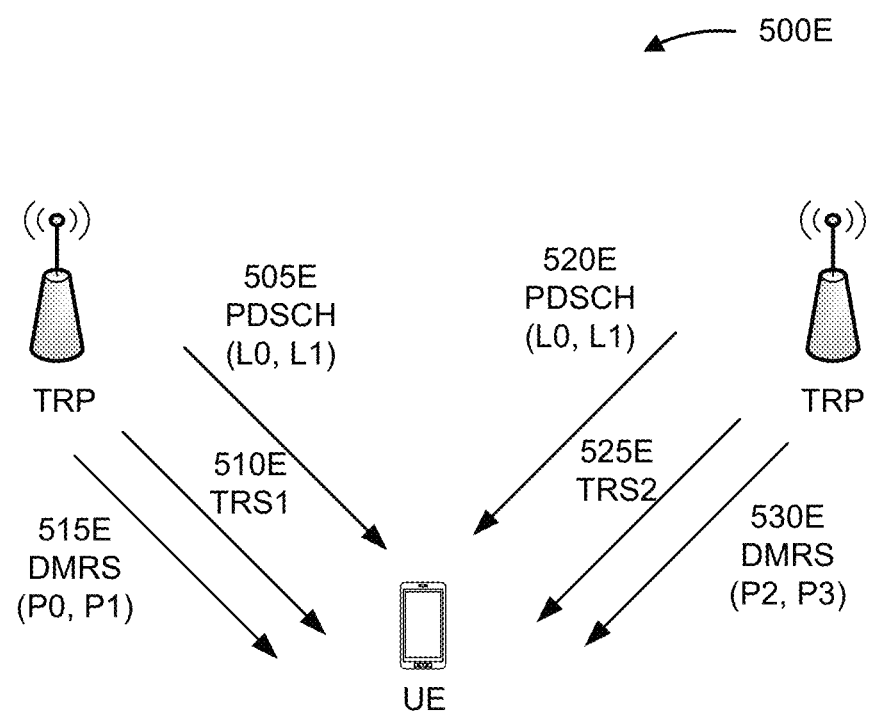

As shown in FIG. 5E, the example 500E of a transmission mode may include a first TRP configured to transmit, to the UE, a first PDSCH communication 505E, a first tracking reference signal (TRS1) 510E, and/or a first DMRS 515E. The first PDSCH communication 505E may include at least one layer (L0 and/or L1). The first DMRS 515E may be associated with at least one CDM group (P0 and/or P1).

As further shown in FIG. 5E, the transmission mode may include a second TRP configured to transmit, to the UE, a second PDSCH communication 520E, a second tracking reference signal (TRS2) 525E, and/or a second DMRS 530E. The second PDSCH communication 520E may use the same layers (L0 and/or L1) as the at least one layer used by the first PDSCH communication 505E. The second tracking reference signal 525E may be different from the first tracking reference signal 510E. The second DMRS 530E may be associated with at least one CDM group (e.g., with DMRS ports P2 and/or P3) that may be different from the at least one CDM group associated with DMRS ports P0 and/or P1 used by the first DMRS 515E.

In the example 500E, the first TRP and the second TRP may be configured not to transmit the PDSCH 505E and the PDSCH 520E simultaneously. For example, the first TRP and the second TRP may be configured in a single TRP mode where one TRP is active and the other TRP is inactive for communications with the UE. The TRPs may switch such that the one TRP becomes inactive and the other TRP becomes active for a period of time based at least in part on channel conditions and/or mobility of the UE, among other examples. In this case, the UE may be configured to communicate with the first TRP for a time and then to communicate with the second TRP for a time.

The example 500E of the transmission mode may include a single TRP, a single TCI, a non-SFN-based PDSCH, and a non-SFN-based DMRS and a non-SFN-based TRS. The example 500E may include a dynamic point/TRP switching configuration. Switching between communications via the first TRP and the second TRP may be configured via DCI and/or MAC control elements (MAC CEs).

In some networks, the network may be configured to operate in one or more of a set of candidate transmission modes. For example, the network may be configured for operation in any of the set of candidate transmission modes, and the network may select from the set of candidate transmission modes for communicating with the UE. The network may signal (e.g., using radio resource control (RRC) signaling, DCI, and/or MAC CEs) to the UE to indicate a transmission mode to be used for communication with the UE.

In some networks, the network may be configured to perform Doppler shift pre-compensation for one or more of the TRPs based at least in part on an explicit Doppler shift signaling per TRP by the UE (e.g., measured based at least in part on corresponding tracking reference signals in downlink) or an implicit Doppler shift indication using an SRS transmission in uplink, among other examples. In some networks, the network may be configured to perform Doppler shift pre-compensation for one TRP to match a Doppler shift of another TRP. The network (e.g., a base station via one or more of the TRPs) may indicate whether Doppler shift pre-compensation is active using dynamic signaling (e.g., DCI and/or MAC CEs).

As indicated above, FIGS. 5A-5E are provided as examples. Other examples may differ from what was described with regard to FIGS. 5A-5E.

In some networks, DMRSs are used as pilots to allow a receiving device to estimate a channel for decoding a received communication. For example, DMRSs may be transmitted within a set of resources allocated for a downlink communication to allow a UE to estimate a channel response and a variance from an expected frequency and/or time of signaling that is allocated for data of the downlink communication. In this way, a UE may perform one or more modifications (e.g., corrections) as a part of reception and demodulation procedures of the received PDSCH signal before attempting to decode the signaling (e.g., associated with a PDSCH allocation and/or PDSCH communication.

In environments with relatively high speeds of UEs relative to TRPs, the UEs and/or the TRPs may experience a reduced time coherency of a communication channel based at least in part on Doppler shifts and/or Doppler spreads (e.g., between different paths of received signals that may be also associated with different TRPs). For this reason, communications within environments with relatively high speeds of UEs may be configured with DMRS configurations having multiple DMRS locations and/or symbols per allocation (e.g., multiple DMRS symbols within a slot) to support improved channel estimation accuracy and to avoid throughput capping because of a channel estimation error floor. However, using multiple DMRS occasions and/or symbols consumes resources that may otherwise be used to carry data. In this way, a configuration with an unnecessarily high number of DMRS occasions may decrease spectral efficiency of the network. A convenient (e.g., most convenient) DMRS configuration choice per scenario may be based at least in part on an optimal tradeoff between channel estimation error floor related limitation from one side and DMRS overhead from the other side. This optimal trade off can be achieved by means of spectral efficiency maximization for a given channel, SNR and a transmission mode scenario.

In some aspects described herein, a UE provides information, to a base station, for the base station to select and/or configure a DMRS configuration for a downlink communication. The information may include an indication of a preferred DMRS configuration, with the preferred DMRS configuration being based at least in part on the one or more reference signals (e.g., measurements of the one or more reference signals) and a transmission mode assumption (e.g., an associated transmission mode) for selection of the preferred DMRS configuration. In some aspects, the information may include an indication of a first preferred DMRS configuration for a first transmission mode and a second preferred DMRS configuration for a second transmission mode.

In some aspects, the preferred DMRS configuration may be based at least in part on UE speed, UE location, channel conditions, SNR conditions, and/or operational MCS and the assumed transmission mode among other examples. The UE may change preferences for DMRS configurations over time based at least in part on changing parameters. In some aspects, for some transmission modes where DMRS transmission is done in a non SFN manner, the UE may indicate a preference for a first DMRS configuration for a first TRP and a preference for a second DMRS configuration for a second TRP.

In some aspects, the information may include an indication of a preferred DMRS configuration per transmission mode (e.g., a multi-TRP transmission mode or an SFN/high speed train transmission mode) and/or per TRP. The information may be coupled to and/or part of a channel state feedback (CSF) report. For example, the UE may report a preferred DMRS configuration per channel state information (CSI) component that is based at least in part on an assumption of a transmission mode (e.g., using the transmission mode).

In some aspects, a non-coherent joint transmission (NCJT) CSF report may be used, and the UE may report one or more of CSI components (e.g., a component associated with a channel measurement resource combination hypothesis) with an indication of a corresponding preferred DMRS configuration per multiple TRP CSI hypothesis and/or per single TRP CSI hypothesis.

In some aspects in which a CSF report includes a multi-TRP CSI hypothesis component, the UE may determine the preferred DMRS configuration (and/or other CSI parameters such as a rank index, a precoding matrix indicator (PMI), and/or channel quality indicator, among other examples) based at least in part a multi-TRP transmission mode assumption (e.g., an assumption by the UE), configuration (e.g., as indicated by the base station), and/or selection (e.g., as selected by the UE). In some aspects, the transmission mode may be selected from a set of candidate transmission modes that include a Release 17 SFN scheme 1 (e.g., as described in connection with example 500A) with Doppler shift pre-compensation, Release 17 SFN scheme 1 without Doppler shift pre-compensation, Release 16 multi-TRP (space division multiplexing (SDM), frequency division multiplexing (FDM), and/or time division multiplexing (TDM)), Release 15 transparent SFN scheme, Release 17 SFN scheme 2 (e.g., as described in connection with example 500B) with Doppler shift pre-compensation, and/or release 17 SFN scheme 2 without Doppler shift pre-compensation, among other examples.

In some aspects in which a CSF report includes a multi-TRP CSI hypothesis component, for one or more of the multi-TRP transmission modes having a non SFN transmission of DMRS, the CSF report may include a report of two or more preferred DMRS configurations. Each of the two or more preferred DMRS configurations may correspond to a DMRS configuration that is selected and/or recommended per TRP, and a PDSCH transmission (e.g., a subsequent communication) may be transmitted jointly by multiple TRPs. A set of candidate transmission modes for this CSF report may include a Release 16 multi-TRP (SDM, FDM, and/or TDM), Release 17 SFN scheme 2 (e.g., as described in connection with example 500B) with pre-compensation, Release 17 SFN scheme 2 without pre-compensation, and/or other transmission mode with non-SFN transmissions of DMRS ports.

In some aspects, the UE may receive an indication of a configuration for transmitting the indication of the preferred DMRS configuration. For example, the configuration may indicate that the UE is to transmit a report that includes an indication of the preferred DMRS configuration and CSI (e.g., a joint report CSI and DMRS report or an extended CSI report with a preferred DMRS indication). The configuration may indicate that the UE is to include in the CSI report the preferred DMRS configuration indication in a set of other reported parameters (e.g., with rank index, PMI, CQI, strongest layer indicator (LI), and/or DMRS) under an associated NCJT CSI report configuration identifier. This may be an extension of a configuration for a general case of a joint DMRS and CSF reporting for non NCJT CSI case. Configuration of a joint CSI and DMRS reporting can be done by means of introduction of a new one or more reportQuantity options to be configured, for example, under RRC configuration of a corresponding CSI report config ID. The new one or more reportQuantity field options may include one or more combinations of DMRS and other already existing reportQuantity options (e.g., combination of DMRS and rank, precoding, channel quality and strongest layer indicators to be reported in the associated CSI report).

In some aspects, a transmission mode option to be assumed for a multi-TRP CSI+DMRS component and/or bundle evaluation may be configured as part of an NCJT CSI report configuration (e.g., a new RRC parameter). This may be used to indicate transmission modes such as a Release 17 SFN scheme 1 (e.g., as described in connection with example 500A) with pre-compensation, Release 17 SFN scheme 1 without pre-compensation, Release 16 multi-TRP (SDM, FDM, and/or TDM), Release 15 transparent SFN, Release 17 SFN scheme 2 (e.g., as described in connection with example 500B) with pre-compensation, and/or Release 17 SFN scheme 2 without pre-compensation, among other examples. In some examples where a single transmission mode is configured, the multi-TRP+DMRS component may be evaluated based at least in part on an assumption of the configured transmission mode. In some examples where multiple transmission modes are configured under an NCJT CSI report configuration, the UE may indicate a preferred transmission mode from a set of candidate transmission modes. The UE may indicate a multi-TRP CSI+DMRS+ preferred transmission mode indication for multi-TRP related portions of the CSF report.

In some aspects in which a multi-TRP CSI component is used, the UE may be configured to transmit preferred DMRS configurations per TRP. This may be used for transmission modes with non-SFN transmission of DMRS ports. In some aspects, the UE transmit an indication of support of transmitting preferred DMRS configurations per TRP via, for example, a capabilities report.

In some aspects, the network (e.g., a base station associated with the multiple TRPs) may indicate a set of candidate DMRS configurations to be evaluated (e.g., from which the UE is to select the preferred DMRS configuration). For example, the network may indicate the set of candidate DMRS configurations via an associated NCJT CSI report configuration using an RRC parameter (e.g., DMRS-Config) to define DMRS restrictions for a specific report. For example, the set of candidate DMRS configurations may be restricted to a range of DMRS locations and/or symbols (e.g., occasions) within an allocation (e.g., a slot and frequency allocation). The NCJT CSI report configuration may be different for different transmission modes.

In some aspects, the UE may transmit the information (e.g., the CSI+DMRS report for an NCJT scenario) via a periodic, aperiodic, and/or semipersistent report. In some aspects, the UE may not transmit the indication of the preferred DMRS configuration in all CSF reports.

In some aspects, the UE may transmit the information related to DMRS preference reporting as part of a two-step DMRS adaptation procedure. In some aspects, the UE may assume that the UE is to use two-step DMRS reporting or may use two-step DMRS reporting based at least in part on an indication and/or configuration from the network. A first step (e.g., short format) may include a periodic or semipersistent CSF report that carries an indication of a request to change a current DMRS configuration (e.g., a single bit indication) of a transmission mode and/or CSI component (e.g., single TRP, multi-TRP, or both) associated with the report. Each of the reported CSI components may be consistent with and/or evaluated based at least in part on a reference DMRS configuration assumption per transmission mode or per TRP that is following a DMRS adaptation process and/or dynamic reconfiguration in time and captures the currently used DMRS configuration option for the associated transmission mode. A same reference DMRS configuration may be used as a reference for a DMRS reconfiguration request. The reference DMRS may be based at least in part on a DMRS configuration traced from a CSI reference slot (e.g., in a case that a transmission mode used for the allocation on the CSI reference slot is matching a transmission mode assumption for a corresponding multi-TRP CSI component or is matching a specific TRP assumption in a case of a single TRP CSI component).

In some aspects, the reference DMRS may be based at least in part on a DMRS configuration assumption per transmission mode or per TRP that is determined based at least in part on a most recent downlink slot with a PDSCH allocation transmitted with an addressed transmission mode option (e.g., in a case of a multi-TRP CSI component) or from an addressed TRP (e.g., in a case of a single TRP CSI component). In some aspects, the reference DMRS may be based at least in part on a currently activated or otherwise indicated DMRS configuration per transmission mode, per TRP, or based on an RRC configured DMRS option (e.g., common for all transmission modes and TRPs or configured for specific transmission modes). In some aspects, the reference DMRS may be based at least in part on a transmission mode preference (e.g., if relevant based at least in part on an NCJT report configuration) and/or may be included in periodic or semipersistent CSF report.

A two-step DMRS adaptation procedure may include a second step that is triggered by the request to change the DMRS configuration from the first step. The second step may include receiving scheduling for transmitting an extended aperiodic CSF+DMRS report that includes CSI components that are consistent with a selected and/or reported preferred DMRS configuration per transmission mode in a case of a multi-TRP CSI component and with the preferred DMRS configuration per TRP in a case of a single TRP CSI component. In order to increase flexibility in a case of an aperiodic DMRS+CSI reporting (e.g., in a case of an NCJT CSF report) that supports improved reconfiguration options, one or more transmission modes configurations and/or indications may be assumed for a CSF report evaluation (e.g., may be dynamically reconfigured based at least in part on a transmission mode preference reported in the first step). Additionally, or alternatively, DMRS restrictions per transmission mode and/or per TRP may be configured or dynamically reconfigured for the aperiodic CSF report at least to be addressed for DMRS configuration preference selection and for CSF report evaluation.

In some aspects, the UE may perform a DMRS preference selection for a joint CSI+DMRS report using associated estimated characteristics and/or side information of a Doppler spread (e.g., root mean squared characteristic) or similarly, a time correlation metric, Doppler shift, delay spread (e.g., root mean squared characteristic) or similarly, a frequency correlation metric, and/or an input signal-to-noise ratio (SNR) and/or signal-to-interference-plus-noise ratio (SINR) per TRP. Doppler shift, Doppler spread, and/or delay spread characteristics may be estimated based at least in part on tracking reference signals (e.g., in case of a non-SFN TRS transmitted per TRP), CSI reference signals (e.g., a non-SFN CSI RS resources associated with each TRP), and/or DMRSs (e.g., a non-SFN DMRS per TRP). Based on the mentioned above estimated channel and SNR characteristics per TRP, an equivalent representative Doppler spread/time correlation, Delay spread/frequency correlation and SNR characteristics for the multi TRP channel can be evaluated on the UE side. Depending on the transmission mode(s) configuration/assumption for NCJT CSF report, an equivalent multi TRP channel on DMRS ports may be a multi-TRP SFN channel (SFN transmission on DMRS ports), a single TRP channel equivalent (if a pre-compensation is employed on the NW side), or a single TRP channel type (non SFN transmission on DMRS ports). The equivalent representative Doppler spread and/or delay spread characteristics may be based at least in part on a transmission mode assumption in case of a multi TRP transmission mode. In case that DMRS preference is determined per TRP (single TRP transmission mode or a multi TRP transmission mode with a non SFN DMRS) a specific TRP assumption and the corresponding to it channel and SNR characteristics can be addressed for DMRS preference determination per TRP.

Based at least in part on the UE providing information, to the base station, for the base station to select and/or configure a DMRS configuration for the downlink communication, with the DMRS configuration based at least in part on a transmission mode used and/or assumed to evaluate DMRS preference on the UE side, the base station may configure subsequent communications with a DMRS configuration that may improve (e.g., optimize) spectral efficiency by balancing a need for sufficient number of DMRS symbols to allow a required level of channel estimation accuracy from one side and a need to limit DMRS overhead from the other side.

Figure 6:
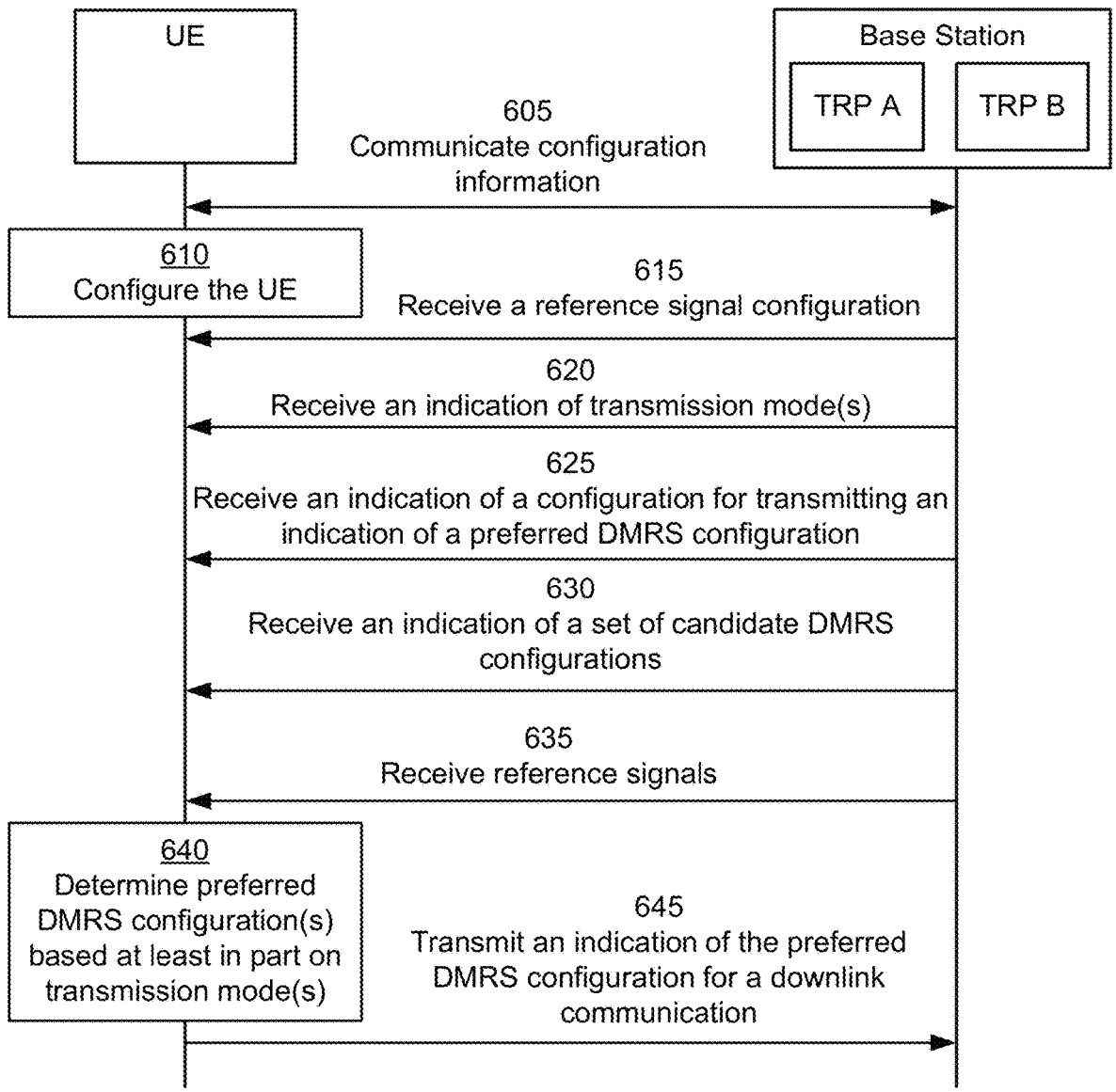
FIG. 6 is a diagram illustrating an example associated with transmission mode-based indications of preferred configurations of demodulation reference signals, in accordance with the present disclosure.

FIG. 6 is a diagram illustrating an example 600 associated with transmission mode-based indications of preferred configurations of DMRSs, in accordance with the present disclosure. As shown in FIG. 6, a base station (e.g., base station 110) may communicate with a UE (e.g., UE 120). In some aspects, the base station and the UE may be part of a wireless network (e.g., wireless network 100). The base station may configure one or more TRPs for communication with the UE. For example, the base station may communicate with the UE via a TRP A and a TRP B.

As shown by reference number 605, the base station and the UE may communicate configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, prior to receiving at least some portion of configuration information from the a network device (e.g., the base station or another device associated with the base station), the UE may transmit, to the network device, an indication of UE capabilities via RRC signaling (e.g., a capabilities report), among other examples. In some aspects, the indication of the UE capabilities may include an indication of one or more configuration parameters (e.g., already known to the UE and the base station) to be used by the base station, including indications of support for different transmission modes (e.g., to generate a set of candidate transmission modes). In some aspects, the UE may transmit an indication of capabilities of the UE, such as an indication that the UE supports transmission of indications of preferred DMRS configurations based at least in part on a transmission mode. In some aspects, the UE may transmit an indication of capabilities of the UE, such as an indication that the UE supports reception of multiple simultaneous transmissions of different DMRS configurations per allocation, where each DMRS configuration corresponds to, and is used by, a different TRP in a multi-TRP transmission with a non-SFN DMRS. In some aspects, the UE may transmit an indication that the UE supports mTRP transmission modes that have a non-SFN transmission of DMRSs.

In some aspects, the UE may receive a first portion of configuration information (e.g., a part of RRC connection information), transmit a second portion of configuration information (e.g., a capabilities report), and receive a third portion of configuration information (e.g., an indication of configurations associated with the second portion of configuration) information. In some aspects, the UE may transmit a first portion of configuration information (e.g., the capabilities report) and then receive a second portion of the configuration information (e.g., the indication of configurations associated with the first portion of configuration).

In some aspects, the configuration information may indicate that the UE is to transmit an indication of UE capability and/or support for providing an indication of a preferred DMRS configuration based at least in part on a transmission mode.

As shown by reference number 610, the UE may configure the UE based at least in part on the configuration information. In some aspects, the UE may be configured to perform one or more operations described herein based at least in part on the configuration information.

As shown by reference number 615, the UE may receive, and the base station may transmit, a reference signal configuration. For example, the reference signal configuration may indicate resources for receiving reference signals, a number of reference signals, and/or other parameters for receiving the reference signals.

As shown by reference number 620, the UE may receive, and the base station may transmit, an indication of one or more transmission modes. For example, the indication of the one or more transmission modes may indicate that the UE is to evaluate the reference signals using the one or more transmission modes (e.g., to assume the one or more transmission modes) to determine a preferred DMRS configuration. In some aspects, the indication of the one or more transmission modes includes an indication of a transmission mode, from a set of candidate transmission modes previously indicated to the UE, to use and/or assume for evaluating a DMRS preference for associated DMRS and CSI reporting (e.g., DMRS+CSI reporting).

In some aspects, the transmission mode is a candidate transmission mode from a set of multiple candidate transmission modes that include a multi-TRP mode, a single TRP mode, an SFN mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single TCI state mode, a multiple TCI states mode, and/or a mode including two or more modes.

As shown by reference number 625, the UE may receive, and the base station may transmit, an indication of a configuration for transmitting an indication of the preferred DMRS configuration. In some aspects, the indication of the configuration for transmitting the indication for the preferred DMRS configuration may include an indication to use a two-step report and/or a specific DMRS and CSI reporting format and report configurations for providing the indication for the preferred DMRS configuration, among other examples.

As shown by reference number 630, the UE may receive, and the base station may transmit, an indication of a set of candidate DMRS configurations. For example, the set of candidate DMRS configurations may indicate that the UE is to select the preferred DMRS confirmation for a specific DMRS reporting, or for any DMRS reporting in general, from the set of candidate DMRS configurations. The set of candidate DMRS configurations may have different DMRS configuration parameters such as a number of DMRS locations per allocation, DMRS type, maximum number of DMRS symbols per DMRS location, and/or the first DMRS symbol location in a slot.

As shown by reference number 635, the UE may receive, and the base station may transmit, reference signals. In some aspects, the reference signals may include CSI reference signals, among other examples. The UE may use the reference signals to evaluate CSI and/or to determine information for a CSI report (e.g., a CSF report) based at least in part on an assumption of applicability of one or more transmission modes.

As shown by reference number 640, the UE may determine one or more preferred DMRS configurations based at least in part on the transmission modes (e.g., transmission modes assumed and/or configured) and the corresponding combination of the reference signals. In some aspects, the base station may determine the one or more preferred DMRS configurations based at least in part on the transmission modes and the reference signals based at least in part on evaluation of CSI components and selection of the preferred DMRS configuration with awareness of, or based in part on one or more indicated, assumed, and/or configured transmission modes. In some aspects, the UE may transmit the indication of the preferred DMRS configuration via one or more of a periodic report, an aperiodic report, or a semi-persistent scheduled report. In some aspects, the UE may transmit the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

In some aspects, a determination of the preferred DMRS configuration to be used for the downlink communication is based at least in part on a Doppler spread or a time correlation characteristic, per TRP, and/or a Doppler shift, per TRP associated with (e.g., estimated based at least in part on or measured based at least in part on, among other examples) the one or more reference signals, and/or a delay spread or a frequency correlation characteristic, per TRP, associated with (e.g., estimated based at least in part on or measured based at least in part on, among other examples) the one or more reference signals. In some aspects, the preferred DMRS configuration to be used for the downlink communication is based at least in part on an SNR or an SINR, per TRP, estimated based on the one or more reference signals, or an SNR or SINR associated with DMRS ports.

Based in part on the above-mentioned estimated channel and SNR characteristics per TRP, an equivalent representative Doppler spread and/or time correlation, delay spread and/or frequency correlation and SNR characteristics for the multi TRP channel can be evaluated on the UE side. Depending on the one or more transmission modes configuration and/or assumption for NCJT CSF report, an equivalent multi TRP channel on DMRS ports may be a multi-TRP SFN channel (SFN transmission on DMRS ports), a single TRP channel equivalent (if a pre-compensation is employed on the NW side), or a single TRP channel type (non SFN transmission on DMRS ports). The equivalent representative Doppler spread and/or delay spread characteristics may be based at least in part on a transmission mode assumption in case of a multi TRP transmission mode. In case that DMRS preference is determined per TRP (single TRP transmission mode or a multi TRP transmission mode with a non SFN DMRS) a specific TRP assumption and the corresponding to it channel and SNR characteristics can be addressed for DMRS preference determination per TRP.

As shown by reference number 645, the UE may transmit, and the base station may receive, an indication of the preferred DMRS configuration for a downlink communication. In some aspects, the base station may configure the downlink communication (e.g., a PDSCH associated with the downlink communication) using the preferred DMRS configuration or using a DMRS configuration that is based at least in part on the preferred DMRS configuration. In some aspects, transmitting the indication of the preferred DMRS configuration includes transmitting the indication via a CSF report and/or a message coupled to or associated with the CSF report.

In some aspects, the transmission mode includes an NCJT mode, and the indication of the preferred DMRS configuration is included in a corresponding CSF report that includes one or more CSI components. The one or more CSI components include an indication of a preferred DMRS configuration for one or more reported CSI components corresponding to different CSI measurement resources and transmission mode hypotheses. For example, the different CSI components correspond to one or more multi-TRP hypotheses and/or single TRP hypotheses.

In some aspects, the indication of the preferred DMRS configuration is included in a report of CSI components and indicates a preferred DMRS configuration, from a set of candidate DMRS configurations, for a CSI component associated with a multi-TRP hypothesis, and the preferred configuration of DMRS is based at least in part on a multi-TRP transmission mode associated with the CSI component.

In some aspects, the preferred DMRS configure may be reported for CSI components corresponding to a single TRP hypothesis. In this way, the UE may select, or indicate a preferred DMRS configuration for selection by the base station, for a corresponding TRP. For a single TRP transmission mode, the DMRS configuration may be selected per single TRP transmission mode option. Single TRP transmission mode examples may include a repetitions mode, a frequency hopping mode (e.g., in uplink), DMRS bundling mode, and/or any new mode that will be introduced for single TRP and may impact DMRS selection.

In some aspects, the indication of the preferred DMRS configuration is included in a report of CSI components and indicates the DMRS configuration and an additional DMRS configuration, from a set of candidate DMRS configurations, for a CSI component corresponding to a multi-TRP hypothesis. The DMRS configuration may be associated with a first TRP that is associated with the multi-TRP hypothesis, and the additional DMRS configuration may be associated with a second TRP that is associated with the multi-TRP hypothesis. The DMRS configuration and the additional DMRS configuration may be used simultaneously for a multi-TRP transmission mode (e.g., for a non-SFN DMRS mode).

In some aspects, the UE may receive an indication of a first candidate transmission mode and a second candidate transmission mode to be used to determine the preferred DMRS configuration to be used for the downlink communication. The UE may transmit an indication of a DMRS configuration preference for the first candidate transmission mode or the second candidate transmission mode, with the preferred DMRS configuration to be used for the downlink communication being based at least in part on a UE-preferred hypothesis for using the first candidate transmission mode or the second candidate transmission mode.

In some aspects, the UE may transmit an indication of an additional (e.g., alternative) preferred DMRS configuration to be used for the downlink communication with the additional preferred DMRS configuration based at least in part on an additional transmission mode associated with the additional preferred DMRS configuration.

Based at least in part on the UE providing information, to the base station, for the base station to select a DMRS configuration for the downlink communication, with the selection of the preferred DMRS configuration based at least in part on a transmission mode assumption, configuration, and/or awareness, the base station may configure subsequent PDSCH communications with the reported DMRS configuration preference that may improve (e.g., optimize) spectral efficiency by balancing a need for sufficient number of DMRS symbols to allow a required level of channel estimation accuracy from one side and a need to limit DMRS overhead from the other side.

As indicated above, FIG. 6 is provided as an example. Other examples may differ from what is described with respect to FIG. 6.

Figure 7:
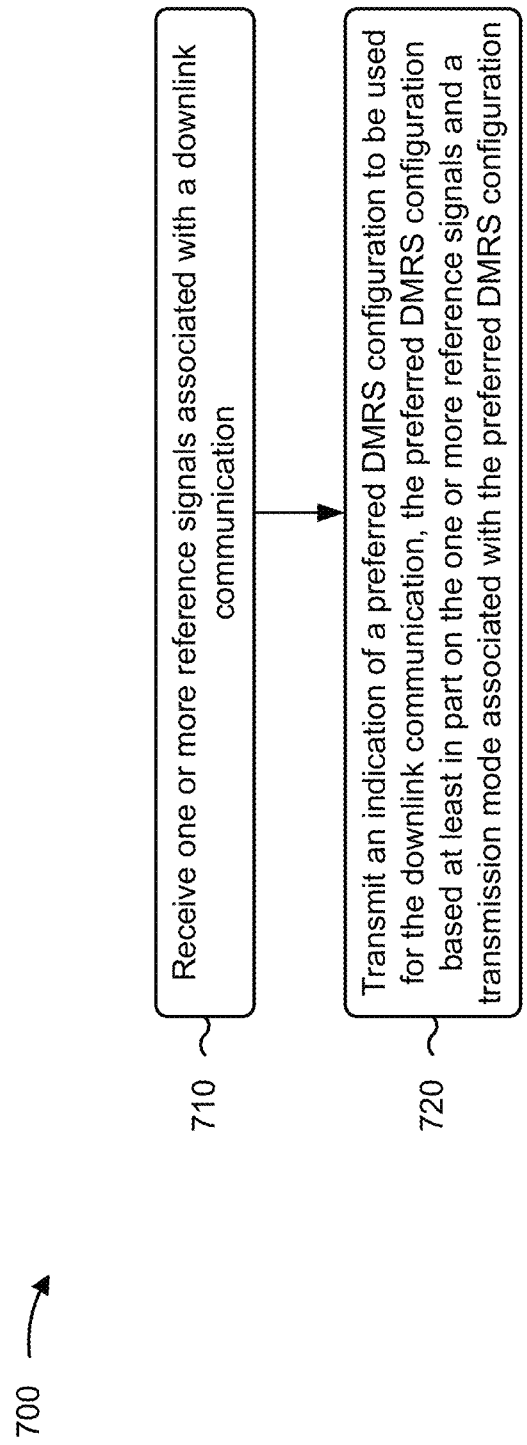
FIGS. 7-8 are diagrams illustrating example processes associated with transmission mode-based indications of preferred configurations of demodulation reference signals, in accordance with the present disclosure.

FIG. 7 is a diagram illustrating an example process 700 performed, for example, by a UE, in accordance with the present disclosure. Example process 700 is an example where the UE (e.g., UE 120) performs operations associated with transmission mode-based indications of preferred configurations of DMRSs.

As shown in FIG. 7, in some aspects, process 700 may include receiving one or more reference signals associated with a downlink communication (block 710). For example, the UE (e.g., using communication manager 140 and/or reception component 902, depicted in FIG. 9) may receive one or more reference signals associated with a downlink communication, as described above.

As further shown in FIG. 7, in some aspects, process 700 may include transmitting an indication of a preferred DMRS configuration to be used for the downlink communication, the preferred DMRS configuration based at least in part on the one or more reference signals and a transmission mode associated with the preferred DMRS configuration (block 720). For example, the UE (e.g., using communication manager 140 and/or transmission component 904, depicted in FIG. 9) may transmit an indication of a preferred DMRS configuration to be used for the downlink communication, the preferred DMRS configuration based at least in part on the one or more reference signals and a transmission mode associated with the preferred DMRS configuration, as described above.

Process 700 may include additional aspects, such as any single aspect or any combination of aspects described below and/or in connection with one or more other processes described elsewhere herein.

In a first aspect, process 700 includes transmitting an indication of an additional preferred DMRS configuration to be used for the downlink communication, the additional preferred DMRS configuration based at least in part on an additional transmission mode associated with the additional preferred DMRS configuration.

In a second aspect, alone or in combination with the first aspect, transmitting the indication of the preferred DMRS configuration comprises transmitting the indication via one or more of a CSF report, or a message coupled to or associated with the CSF report.

In a third aspect, alone or in combination with one or more of the first and second aspects, the transmission mode is a candidate transmission mode from a set of multiple candidate transmission modes comprising one or more of a multi-TRP mode, a single TRP mode, a SFN mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single TCI state mode, a multiple TCI states mode, or a mode including two or more modes thereof.

In a fourth aspect, alone or in combination with one or more of the first through third aspects, the transmission mode comprises a NCJT mode, and wherein the indication of the preferred DMRS configuration is included in a corresponding CSI reporting comprising one or more CSI components that includes an indication of a preferred DMRS configuration for one or more reported CSI components corresponding to different CSI measurement resources and transmission mode hypotheses.

In a fifth aspect, alone or in combination with one or more of the first through fourth aspects, the different CSI components correspond to one or more of multi-TRP hypotheses or single TRP hypotheses.

In a sixth aspect, alone or in combination with one or more of the first through fifth aspects, the indication of the preferred DMRS configuration is included in a report of CSI components and indicates a preferred DMRS configuration, from a set of candidate DMRS configurations, for a CSI component associated with a multi-TRP hypothesis, and wherein the preferred configuration of DMRS is based at least in part on a multi-TRP transmission mode associated with the CSI component.

In a seventh aspect, alone or in combination with one or more of the first through sixth aspects, the indication of the preferred DMRS configuration is included in a report of CSI components and indicates the DMRS configuration and an additional DMRS configuration, from a set of candidate DMRS configurations, for a CSI component corresponding to a multi-TRP hypothesis, and wherein the DMRS configuration is associated with a first TRP that is associated with the multi-TRP hypothesis and the additional DMRS configuration is associated with a second TRP that is associated with the multi-TRP hypothesis.

In an eighth aspect, alone or in combination with one or more of the first through seventh aspects, process 700 includes receiving an indication of a configuration for transmitting the indication of the preferred DMRS configuration.

In a ninth aspect, alone or in combination with one or more of the first through eighth aspects, process 700 includes receiving an indication of a transmission mode to be used to determine the preferred DMRS configuration to be used for the downlink communication using the transmission mode, wherein the preferred DMRS configuration to be used for the downlink communication is based at least in part on the indicated transmission mode.

In a tenth aspect, alone or in combination with one or more of the first through ninth aspects, process 700 includes receiving an indication of a first candidate transmission mode and a second candidate transmission mode to be used to determine the preferred DMRS configuration to be used for the downlink communication, and transmitting an indication of a DMRS configuration preference for the first candidate transmission mode or the second candidate transmission mode, wherein the preferred DMRS configuration to be used for the downlink communication is based at least in part on a UE-preferred hypothesis for using the first candidate transmission mode or the second candidate transmission mode.

In an eleventh aspect, alone or in combination with one or more of the first through tenth aspects, process 700 includes receiving an indication of candidate DMRS configurations associated with the transmission mode, wherein the preferred DMRS configuration is one of the candidate DMRS configurations.

In a twelfth aspect, alone or in combination with one or more of the first through eleventh aspects, transmitting the indication of the preferred DMRS configuration comprises one or more of transmitting the indication of the preferred DMRS configuration via one or more of a periodic report, an aperiodic report, or a semi-persistent scheduled report, or transmitting the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

In a thirteenth aspect, alone or in combination with one or more of the first through twelfth aspects, the indication of the preferred DMRS configuration to be used for the downlink communication is based at least in part on one or more of a Doppler spread or a time correlation characteristic, per TRP, associated with the one or more reference signals, a delay spread or a frequency correlation characteristic, per TRP, associated with the one or more reference signals, a signal-to-noise ratio or a signal-to-interference-plus-noise ratio, per TRP, associated with the one or more reference signals, or a signal-to-interference-plus-noise ratio or a signal-to-interference-plus-noise ratio associated with DMRS ports, an indication associated with Doppler spread or time correlation characteristic for DMRS ports for an associated multi-TRP transmission mode evaluated based at least in part on a transmission mode assumption and based at least in part on Doppler characteristics or time correlation measurements per TRP, an indication associated with Delay spread or frequency correlation characteristic for DMRS ports for an associated multi-TRP transmission mode evaluated based at least in part on a transmission mode assumption and based at least in part on Delay spread or frequency correlation measurements per TRP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
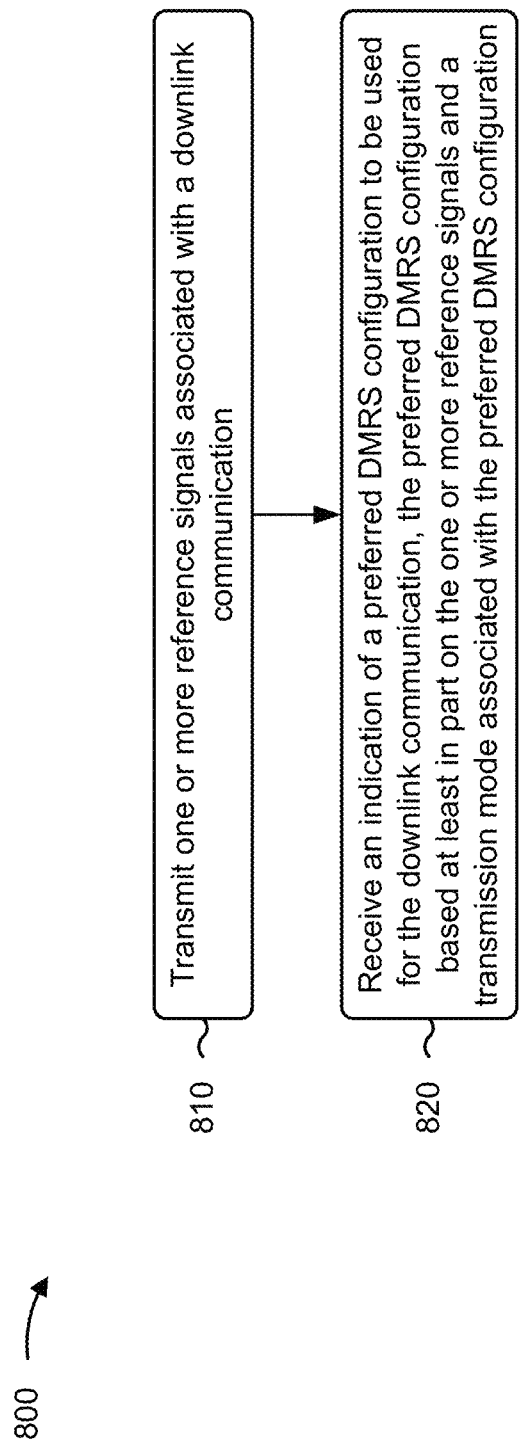

FIG. 8 is a diagram illustrating an example process 800 performed, for example, by a base station, in accordance with the present disclosure. Example process 800 is an example where the base station (e.g., base station 110) performs operations associated with transmission mode-based indications of preferred configurations of demodulation reference signals.

As shown in FIG. 8, in some aspects, process 800 may include transmitting one or more reference signals associated with a downlink communication (block 810). For example, the base station (e.g., using communication manager 150 and/or transmission component 1004, depicted in FIG. 10) may transmit one or more reference signals associated with a downlink communication, as described above.

As further shown in FIG. 8, in some aspects, process 800 may include receiving an indication of a preferred DMRS configuration to be used for the downlink communication, the preferred DMRS configuration based at least in part on the one or more reference signals and a transmission mode associated with the preferred DMRS configuration (block 820). For example, the base station (e.g., using communication manager 150 and/or reception component 1002, depicted in FIG. 10) may receive an indication of a preferred DMRS configuration to be used for the downlink communication, the preferred DMRS configuration based at least in part on the one or more reference signals and a transmission mode associated with the preferred DMRS configuration, as described above.

Process 800 may include additional aspects, such as any single aspect or any combination of aspects described below and/or in connection with one or more other processes described elsewhere herein.

In a first aspect, process 800 includes receiving an indication of an additional preferred DMRS configuration to be used for the downlink communication, the additional preferred DMRS configuration based at least in part on an additional transmission mode associated with the additional preferred DMRS configuration.

In a second aspect, alone or in combination with the first aspect, receiving the indication of the preferred DMRS configuration comprises receiving the indication via one or more of a CSF report, or a message coupled to or associated with the CSF report.

In a third aspect, alone or in combination with one or more of the first and second aspects, the transmission mode is a candidate transmission mode from a set of multiple candidate transmission modes comprising one or more of a multi-TRP mode, a single TRP mode, a SFN mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single TCI state mode, a multiple TCI states mode, or a mode including two or more modes thereof.

In a fourth aspect, alone or in combination with one or more of the first through third aspects, the transmission mode comprises a NCJT mode, and wherein the indication of the preferred DMRS configuration is included in a corresponding CSI reporting comprising one or more CSI components that includes an indication of a preferred DMRS configuration for one or more reported CSI components corresponding to different CSI measurement resources and transmission mode hypotheses.

In a fifth aspect, alone or in combination with one or more of the first through fourth aspects, the different CSI components correspond to one or more of multi-TRP hypotheses or single TRP hypotheses.

In a sixth aspect, alone or in combination with one or more of the first through fifth aspects, the indication of the preferred DMRS configuration is included in a report of CSI components and indicates a preferred DMRS configuration, from a set of candidate DMRS configurations, for a CSI component associated with a multi-TRP hypothesis, and wherein the preferred configuration of DMRS is based at least in part on a multi-TRP transmission mode associated with the CSI component.

In a seventh aspect, alone or in combination with one or more of the first through sixth aspects, the indication of the preferred DMRS configuration is included in a report of CSI components and indicates the DMRS configuration and an additional DMRS configuration, from a set of candidate DMRS configurations, for a CSI component corresponding to a multi-TRP hypothesis, and wherein the DMRS configuration is associated with a first TRP that is associated with the multi-TRP hypothesis and the additional DMRS configuration is associated with a second TRP that is associated with the multi-TRP hypothesis.

In an eighth aspect, alone or in combination with one or more of the first through seventh aspects, process 800 includes transmitting an indication of a configuration for transmitting the indication of the preferred DMRS configuration.

In a ninth aspect, alone or in combination with one or more of the first through eighth aspects, process 800 includes transmitting an indication of a transmission mode to be used to determine the preferred DMRS configuration to be used for the downlink communication using the transmission mode, wherein the preferred DMRS configuration to be used for the downlink communication is based at least in part on the indicated transmission mode.

In a tenth aspect, alone or in combination with one or more of the first through ninth aspects, process 800 includes transmitting an indication of a first candidate transmission mode and a second candidate transmission mode to be used to determine the preferred DMRS configuration to be used for the downlink communication, and receiving an indication of a DMRS configuration preference for the first candidate transmission mode or the second candidate transmission mode, wherein the preferred DMRS configuration to be used for the downlink communication is based at least in part on a UE-preferred hypothesis for using the first candidate transmission mode or the second candidate transmission mode.

In an eleventh aspect, alone or in combination with one or more of the first through tenth aspects, process 800 includes transmitting an indication of candidate DMRS configurations associated with the transmission mode, wherein the preferred DMRS configuration is one of the candidate DMRS configurations.

In a twelfth aspect, alone or in combination with one or more of the first through eleventh aspects, receiving the indication of the preferred DMRS configuration comprises one or more of receiving the indication of the preferred DMRS configuration via one or more of a periodic report, an aperiodic report, or a semi-persistent scheduled report, or receiving the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

In a thirteenth aspect, alone or in combination with one or more of the first through twelfth aspects, the indication of the preferred DMRS configuration to be used for the downlink communication is based at least in part on one or more of a Doppler spread or a time correlation characteristic, per TRP, associated with the one or more reference signals, a delay spread or a frequency correlation characteristic, per TRP, associated with the one or more reference signals, a signal-to-noise ratio or a signal-to-interference-plus-noise ratio, per TRP, associated with the one or more reference signals, or a signal-to-interference-plus-noise ratio or a signal-to-interference-plus-noise ratio associated with DMRS ports, an indication associated with Doppler spread or time correlation characteristic for DMRS ports for an associated multi-TRP transmission mode evaluated based at least in part on a transmission mode assumption and based at least in part on Doppler characteristics or time correlation measurements per TRP, an indication associated with Delay spread or frequency correlation characteristic for DMRS ports for an associated multi-TRP transmission mode evaluated based at least in part on a transmission mode assumption and based at least in part on Delay spread or frequency correlation measurements per TRP.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
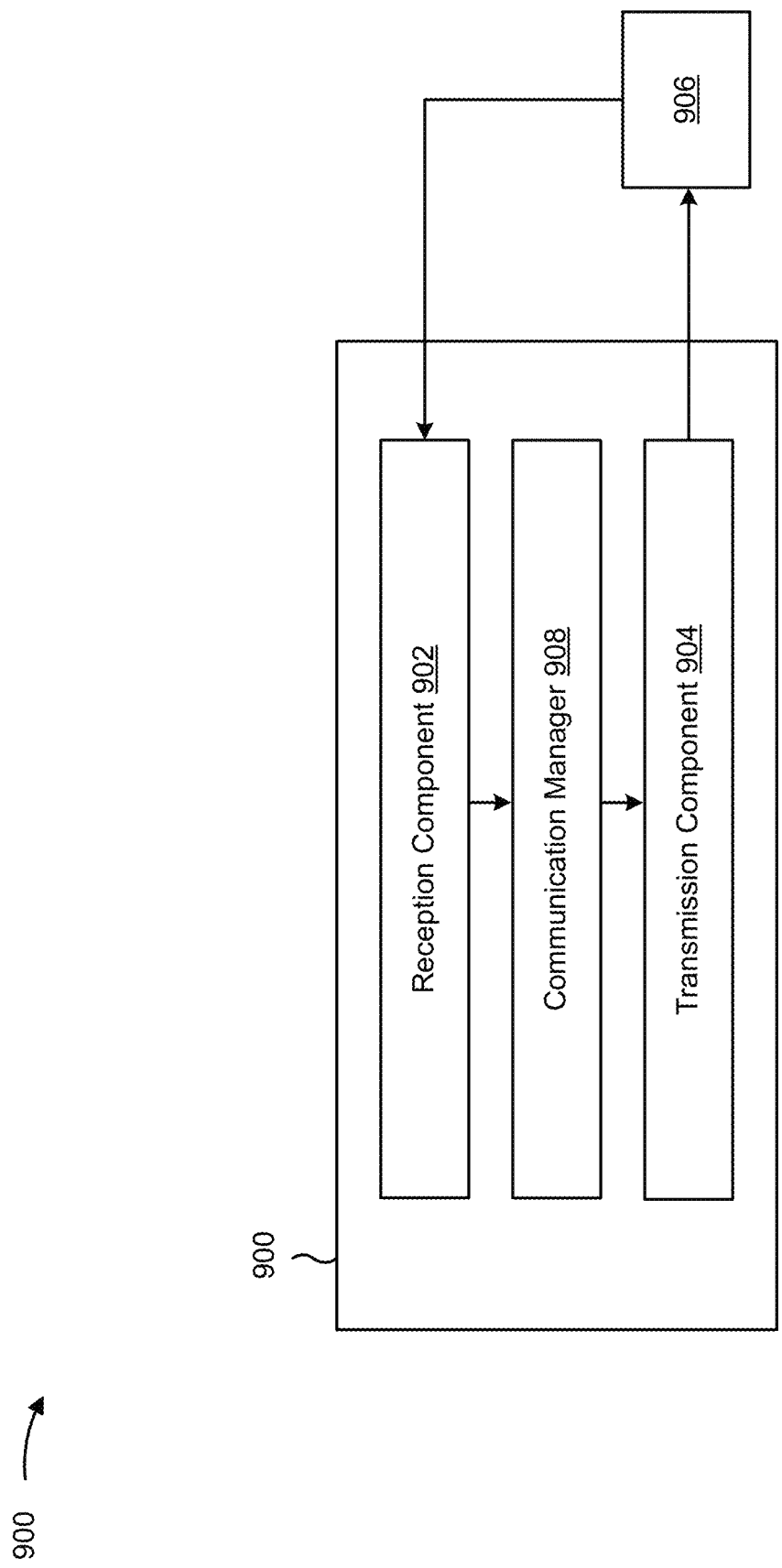
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., communication manager 140), which may provide instructions to the reception component 902 and/or the transmission component 904.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The below paragraphs are for the method claim set starting with claim 1.

The reception component 902 may receive one or more reference signals associated with a downlink communication. The transmission component 904 may transmit an indication of a preferred DMRS configuration to be used for the downlink communication, the preferred DMRS configuration based at least in part on the one or more reference signals and a transmission mode associated with the preferred DMRS configuration.

The transmission component 904 may transmit an indication of an additional preferred DMRS configuration to be used for the downlink communication, the additional preferred DMRS configuration based at least in part on an additional transmission mode associated with the additional preferred DMRS configuration.

The reception component 902 may receive an indication of a configuration for transmitting the indication of the preferred DMRS configuration.

The reception component 902 may receive an indication of a transmission mode to be used to determine the preferred DMRS configuration to be used for the downlink communication using the transmission mode wherein the preferred DMRS configuration to be used for the downlink communication is based at least in part on the indicated transmission mode.

The reception component 902 may receive an indication of a first candidate transmission mode and a second candidate transmission mode to be used to determine the preferred DMRS configuration to be used for the downlink communication.

The transmission component 904 may transmit an indication of a DMRS configuration preference for the first candidate transmission mode or the second candidate transmission mode wherein the preferred DMRS configuration to be used for the downlink communication is based at least in part on a UE-preferred hypothesis for using the first candidate transmission mode or the second candidate transmission mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
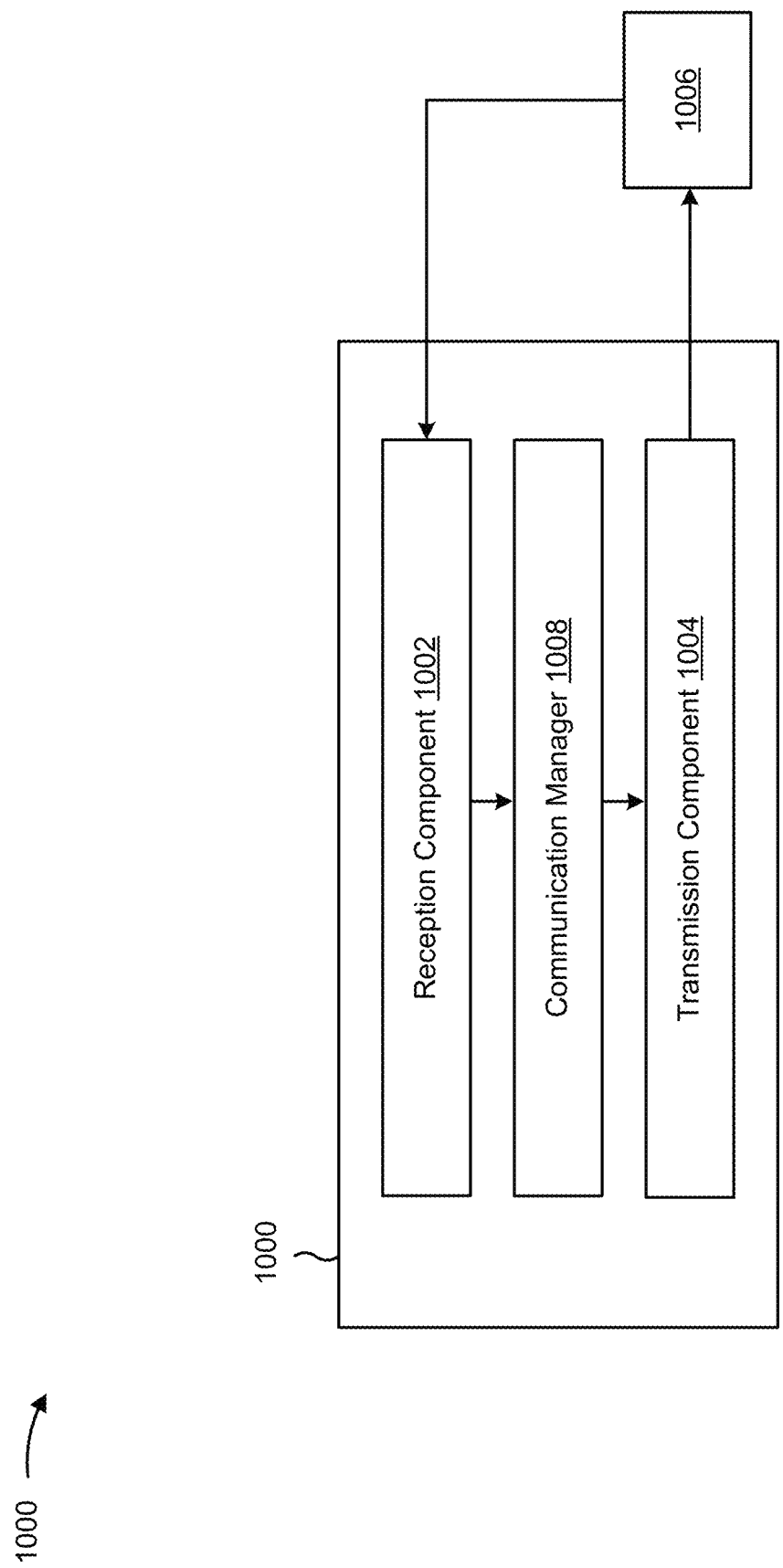

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150) which may provide instructions to the reception component 1002 and/or the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit one or more reference signals associated with a downlink communication. The reception component 1002 may receive an indication of a preferred DMRS configuration to be used for the downlink communication, the preferred DMRS configuration based at least in part on the one or more reference signals and a transmission mode associated with the preferred DMRS configuration.

The reception component 1002 may receive an indication of an additional preferred DMRS configuration to be used for the downlink communication, the additional preferred DMRS configuration based at least in part on an additional transmission mode associated with the additional preferred DMRS configuration.

The transmission component 1004 may transmit an indication of a configuration for transmitting the indication of the preferred DMRS configuration.

The transmission component 1004 may transmit an indication of a transmission mode to be used to determine the preferred DMRS configuration to be used for the downlink communication using the transmission mode wherein the preferred DMRS configuration to be used for the downlink communication is based at least in part on the indicated transmission mode.

The transmission component 1004 may transmit an indication of a first candidate transmission mode and a second candidate transmission mode to be used to determine the preferred DMRS configuration to be used for the downlink communication.

The reception component 1002 may receive an indication of a DMRS configuration preference for the first candidate transmission mode or the second candidate transmission mode wherein the preferred DMRS configuration to be used for the downlink communication is based at least in part on a UE-preferred hypothesis for using the first candidate transmission mode or the second candidate transmission mode.

The transmission component 1004 may transmit an indication of candidate DMRS configurations associated with the transmission mode wherein the preferred DMRS configuration is one of the candidate DMRS configurations.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving one or more reference signals associated with a downlink communication; and transmitting an indication of a preferred demodulation reference signal (DMRS) configuration to be used for the downlink communication, the preferred DMRS configuration based at least in part on the one or more reference signals and a transmission mode associated with the preferred DMRS configuration.

Aspect 2: The method of Aspect 1, further comprising: transmitting an indication of an additional preferred DMRS configuration to be used for the downlink communication, the additional preferred DMRS configuration based at least in part on an additional transmission mode associated with the additional preferred DMRS configuration.

Aspect 3: The method of any of Aspects 1-2, wherein transmitting the indication of the preferred DMRS configuration comprises transmitting the indication via one or more of: a channel state feedback (CSF) communication, or a message coupled to or associated with the CSF report.

Aspect 4: The method of any of Aspects 1-3, wherein the transmission mode is a candidate transmission mode from a set of multiple candidate transmission modes comprising one or more of: a multi-transmission reception point (TRP) mode, a single TRP mode, a single frequency network (SFN) mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single transmission configuration (TCI) state mode, a multiple TCI states mode, or a mode including two or more modes thereof.

Aspect 5: The method of any of Aspects 1-4, wherein the transmission mode comprises a non-coherent joint transmission (NCJT) mode, and wherein the indication of the preferred DMRS configuration is included in a corresponding CSI reporting comprising one or more channel state information (CSI) components that includes an indication of a preferred DMRS configuration for one or more reported CSI components corresponding to different CSI measurement resources and transmission mode hypotheses.

Aspect 6: The method of Aspect 5, wherein the different CSI components correspond to one or more of multi-transmission reception point (TRP) hypotheses or single TRP hypotheses.

Aspect 7: The method of any of Aspects 1-6, wherein the indication of the preferred DMRS configuration is included in a report of channel state information (CSI) components and indicates a preferred DMRS configuration, from a set of candidate DMRS configurations, for a CSI component associated with a multi-transmission reception point (TRP) hypothesis, and wherein the preferred configuration of DMRS is based at least in part on a multi-TRP transmission mode associated with the CSI component.

Aspect 8: The method of any of Aspects 1-7, wherein the indication of the preferred DMRS configuration is included in a report of channel state information (CSI) components and indicates the DMRS configuration and an additional DMRS configuration, from a set of candidate DMRS configurations, for a CSI component corresponding to a multi-transmission reception point (TRP) hypothesis, and wherein the DMRS configuration is associated with a first TRP that is associated with the multi-TRP hypothesis and the additional DMRS configuration is associated with a second TRP that is associated with the multi-TRP hypothesis.

Aspect 9: The method of any of Aspects 1-8, further comprising: receiving an indication of a configuration for transmitting the indication of the preferred DMRS configuration.

Aspect 10: The method of any of Aspects 1-9, further comprising: receiving an indication of a transmission mode to be used to determine the preferred DMRS configuration to be used for the downlink communication using the transmission mode, wherein the preferred DMRS configuration to be used for the downlink communication is based at least in part on the indicated transmission mode.

Aspect 11: The method of any of Aspects 1-10, further comprising: receiving an indication of a first candidate transmission mode and a second candidate transmission mode to be used to determine the preferred DMRS configuration to be used for the downlink communication; and transmitting an indication of a DMRS configuration preference for the first candidate transmission mode or the second candidate transmission mode, wherein the preferred DMRS configuration to be used for the downlink communication is based at least in part on a UE-preferred hypothesis for using the first candidate transmission mode or the second candidate transmission mode.

Aspect 12: The method of any of Aspects 1-11, further comprising: receiving an indication of candidate DMRS configurations associated with the transmission mode, wherein the preferred DMRS configuration is one of the candidate DMRS configurations.

Aspect 13: The method of any of Aspects 1-10, wherein transmitting the indication of the preferred DMRS configuration comprises one or more of: transmitting the indication of the preferred DMRS configuration via one or more of a periodic report, an aperiodic report, or a semi-persistent scheduled report, or transmitting the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

Aspect 14: The method of any of Aspects 1-13 wherein the indication of the preferred DMRS configuration to be used for the downlink communication is based at least in part on one or more of: a Doppler spread or a time correlation characteristic, per transmission reception point (TRP), associated with the one or more reference signals, a delay spread or a frequency correlation characteristic, per TRP, associated with the one or more reference signals, a signal-to-noise ratio or a signal-to-interference-plus-noise ratio, per TRP, associated with the one or more reference signals, or a signal-to-interference-plus-noise ratio or a signal-to-interference-plus-noise ratio associated with DMRS ports, an indication associated with Doppler spread or time correlation characteristic for DMRS ports for an associated multi-TRP transmission mode evaluated based at least in part on a transmission mode assumption and based at least in part on Doppler characteristics or time correlation measurements per TRP, an indication associated with Delay spread or frequency correlation characteristic for DMRS ports for an associated multi-TRP transmission mode evaluated based at least in part on a transmission mode assumption and based at least in part on Delay spread or frequency correlation measurements per TRP.

Aspect 15: A method of wireless communication performed by a base station, comprising: transmitting one or more reference signals associated with a downlink communication; and receiving an indication of a preferred demodulation reference signal (DMRS) configuration to be used for the downlink communication, the preferred DMRS configuration based at least in part on the one or more reference signals and a transmission mode associated with the preferred DMRS configuration.

Aspect 16: The method of Aspect 15, further comprising: receiving an indication of an additional preferred DMRS configuration to be used for the downlink communication, the additional preferred DMRS configuration based at least in part on an additional transmission mode associated with the additional preferred DMRS configuration.

Aspect 17: The method of any of Aspects 15-16, wherein receiving the indication of the preferred DMRS configuration comprises receiving the indication via one or more of: a channel state feedback (CSF) communication, or a message coupled to or associated with the CSF report.

Aspect 18: The method of any of Aspects 15-17, wherein the transmission mode is a candidate transmission mode from a set of multiple candidate transmission modes comprising one or more of: a multi-transmission reception point (TRP) mode, a single TRP mode, a single frequency network (SFN) mode, an SFN data channel mode, a non-SFN data channel mode, an SFN DMRS mode, a non-SFN DMRS mode, a dynamic point switching mode, a Doppler or delay pre-compensation mode, a non-pre-compensation mode, a single transmission configuration (TCI) state mode, a multiple TCI state mode, or a mode including two or more modes thereof.

Aspect 19: The method of any of Aspects 15-18, wherein the transmission mode comprises a non-coherent joint transmission (NCJT) mode, and wherein the indication of the preferred DMRS configuration is included in a corresponding CSI reporting comprising one or more channel state information (CSI) components that includes an indication of a preferred DMRS configuration for one or more reported CSI components corresponding to different CSI measurement resources and transmission mode hypotheses.

Aspect 20: The method of Aspect 19, wherein the different CSI components correspond to one or more of multi-transmission reception point (TRP) hypotheses or single TRP hypotheses.

Aspect 21: The method of any of Aspects 15-20, wherein the indication of the preferred DMRS configuration is included in a report of channel state information (CSI) components and indicates a preferred DMRS configuration, from a set of candidate DMRS configurations, for a CSI component associated with a multi-transmission reception point (TRP) hypothesis, and wherein the preferred configuration of DMRS is based at least in part on a multi-TRP transmission mode associated with the CSI component.

Aspect 22: The method of any of Aspects 15-21, wherein the indication of the preferred DMRS configuration is included in a report of channel state information (CSI) components and indicates the DMRS configuration and an additional DMRS configuration, from a set of candidate DMRS configurations, for a CSI component corresponding to a multi-transmission reception point (TRP) hypothesis, and wherein the DMRS configuration is associated with a first TRP that is associated with the multi-TRP hypothesis and the additional DMRS configuration is associated with a second TRP that is associated with the multi-TRP hypothesis.

Aspect 23: The method of any of Aspects 15-22, further comprising: transmitting an indication of a configuration for transmitting the indication of the preferred DMRS configuration.

Aspect 24: The method of any of Aspects 15-23, further comprising: transmitting an indication of a transmission mode to be used to determine the preferred DMRS configuration to be used for the downlink communication using the transmission mode, wherein the preferred DMRS configuration to be used for the downlink communication is based at least in part on the indicated transmission mode.

Aspect 25: The method of any of Aspects 15-24, further comprising: transmitting an indication of a first candidate transmission mode and a second candidate transmission mode to be used to determine the preferred DMRS configuration to be used for the downlink communication; and receiving an indication of a DMRS configuration preference for the first candidate transmission mode or the second candidate transmission mode, wherein the preferred DMRS configuration to be used for the downlink communication is based at least in part on a UE-preferred hypothesis for using the first candidate transmission mode or the second candidate transmission mode.

Aspect 26: The method of any of Aspects 15-25, further comprising: transmitting an indication of candidate DMRS configurations associated with the transmission mode, wherein the preferred DMRS configuration is one of the candidate DMRS configurations.

Aspect 27: The method of any of Aspects 15-26, wherein receiving the indication of the preferred DMRS configuration comprises one or more of: receiving the indication of the preferred DMRS configuration via one or more of a periodic report, an aperiodic report, or a semi-persistent scheduled report, or receiving the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

Aspect 28: The method of any of Aspects 15-26, wherein the indication of the preferred DMRS configuration to be used for the downlink communication is based at least in part on one or more of: a Doppler spread or a time correlation characteristic, per transmission reception point (TRP), associated with the one or more reference signals, a delay spread or a frequency correlation characteristic, per TRP, associated with the one or more reference signals, a signal-to-noise ratio or a signal-to-interference-plus-noise ratio, per TRP, associated with the one or more reference signals, or a signal-to-interference-plus-noise ratio or a signal-to-interference-plus-noise ratio associated with DMRS ports, an indication associated with Doppler spread or time correlation characteristic for DMRS ports for an associated multi-TRP transmission mode evaluated based at least in part on a transmission mode assumption and based at least in part on Doppler characteristics or time correlation measurements per TRP, an indication associated with Delay spread or frequency correlation characteristic for DMRS ports for an associated multi-TRP transmission mode evaluated based at least in part on a transmission mode assumption and based at least in part on Delay spread or frequency correlation measurements per TRP.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a network entity associated with multiple transmission reception points (TRPs), one or more reference signals associated with a downlink communication; and transmitting an indication of a preferred demodulation reference signal (DMRS) configuration and an additional DMRS configuration to be used for the downlink communication, the preferred DMRS configuration and the additional DMRS configuration based at least in part on the one or more reference signals, wherein the preferred DMRS configuration is based at least in part on a speed of the UE and a first candidate transmission mode from a set of multiple candidate transmission modes, the first candidate transmission mode associated with the preferred DMRS configuration, wherein the additional DMRS configuration is based at least in part on a second candidate transmission mode, from the set of multiple candidate transmission modes, that is associated with the additional DMRS configuration, and wherein the indication of the preferred DMRS configuration and the additional DMRS configuration to be used for the downlink communication is based at least in part on one or more of:

a Doppler spread or a time correlation characteristic, per TRP of the multiple TRPs, associated with the one or more reference signals, a signal-to-noise ratio or a signal-to-interference-plus-noise ratio, per TRP of the multiple TRPs, associated with the one or more reference signals, or an indication associated with Doppler spread or time correlation characteristic for DMRS ports for an associated multi-TRP transmission mode evaluated based at least in part on a transmission mode assumption and based at least in part on Doppler characteristics or time correlation measurements per TRP.

2. The method of claim 1, wherein transmitting the indication of the preferred DMRS configuration and the additional DMRS configuration comprises transmitting the indication via one or more of:

a channel state feedback (CSF) report, or
a message coupled to or associated with the CSF report.

3. The method of claim 1, wherein the set of multiple candidate transmission modes comprises one or more of:

a single frequency network (SFN) mode,
an SFN data channel mode,
a non-SFN data channel mode,
an SFN DMRS mode,
a non-SFN DMRS mode,
a dynamic point switching mode,
a Doppler or delay pre-compensation mode,
a non-pre-compensation mode,
a single transmission configuration (TCI) state mode,
a multiple TCI states mode, or
a mode including two or more modes thereof.

4. The method of claim 1, wherein the first candidate transmission mode comprises a non-coherent joint transmission (NCJT) mode, and wherein the indication of the preferred DMRS configuration is included in a corresponding channel state information (CSI) reporting comprising one or more CSI components that includes an indication of a preferred DMRS configuration for one or more reported CSI components corresponding to different CSI measurement resources and transmission mode hypotheses.

5. The method of claim 4, wherein the one of more reported CSI components correspond to one or more of multi-TRP hypotheses or single TRP hypotheses.

6. The method of claim 1, wherein the indication of the preferred DMRS configuration is included in a report of channel state information (CSI) components and indicates the preferred DMRS configuration, from a set of candidate DMRS configurations, for a CSI component associated with a multi-TRP hypothesis, and wherein the preferred DMRS configuration is based at least in part on a multi-TRP transmission mode associated with the CSI component.

7. The method of claim 1, wherein the indication of the preferred DMRS configuration and the additional DMRS configuration is included in a report of channel state information (CSI) components and indicates the preferred DMRS configuration and the additional DMRS configuration, from a set of candidate DMRS configurations, for a CSI component corresponding to a multi-TRP hypothesis, and wherein the preferred DMRS configuration is associated with a first TRP that is associated with the multi-TRP hypothesis and the additional DMRS configuration is associated with a second TRP that is associated with the multi-TRP hypothesis.

8. The method of claim 1, further comprising:
receiving an indication of a configuration for transmitting the indication of the preferred DMRS configuration.

9. The method of claim 1, further comprising:
receiving an indication of a transmission mode to be used to determine the preferred DMRS configuration to be used for the downlink communication using the indicated transmission mode, wherein the preferred DMRS configuration to be used for the downlink communication is based at least in part on the indicated transmission mode.

10. The method of claim 1, further comprising:
receiving an indication of a first candidate transmission mode and a second candidate transmission mode to be used to determine the preferred DMRS configuration to be used for the downlink communication; and transmitting an indication of a DMRS configuration preference for the first candidate transmission mode or the second candidate transmission mode, wherein the preferred DMRS configuration to be used for the downlink communication is based at least in part on a UE-preferred hypothesis for using the first candidate transmission mode or the second candidate transmission mode.

11. The method of claim 1, further comprising:
receiving an indication of candidate DMRS configurations associated with the first candidate transmission mode, wherein the preferred DMRS configuration is one of the candidate DMRS configurations.

12. The method of claim 1, wherein transmitting the indication of the preferred DMRS configuration comprises one or more of:

transmitting the indication of the preferred DMRS configuration via one or more of a periodic report, an aperiodic report, or a semi-persistent scheduled report, or transmitting the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

13. The method of claim 1, wherein the speed of the UE comprises a travel speed of the UE.

14. A method of wireless communication performed by a network entity associated with multiple transmission reception points (TRPs), comprising:
transmitting one or more reference signals associated with a downlink communication; and
receiving an indication of a preferred demodulation reference signal (DMRS) configuration and an additional DMRS configuration to be used for the downlink communication, the preferred DMRS configuration and the additional DMRS configuration based at least in part on the one or more reference signals,
wherein the preferred DMRS configuration is based at least in part on a speed of a user equipment (UE) and a first candidate transmission mode from a set of multiple candidate transmission modes, the first candidate transmission mode associated with the preferred DMRS configuration,
wherein the additional DMRS configuration is based at least in part on a second candidate transmission mode, from the set of multiple candidate transmission modes, that is associated with the additional DMRS configuration, and
wherein the indication of the preferred DMRS configuration and the additional DMRS configuration to be used for the downlink communication is based at least in part on one or more of:
a Doppler spread or a time correlation characteristic, per TRP of the multiple TRPs, associated with the one or more reference signals,
a signal-to-noise ratio or a signal-to-interference-plus-noise ratio, per TRP of the multiple TRPs, associated with the one or more reference signals, or
an indication associated with Doppler spread or time correlation characteristic for DMRS ports for an associated multi-TRP transmission mode evaluated based at least in part on a transmission mode assumption and based at least in part on Doppler characteristics or time correlation measurements per TRP.

15. The method of claim 14, wherein receiving the indication of the preferred DMRS configuration and the additional DMRS configuration comprises receiving the indication via one or more of:
a channel state feedback (CSF) report, or
a message coupled to or associated with the CSF report.

16. The method of claim 14, wherein the set of multiple candidate transmission modes comprises one or more of:
a single frequency network (SFN) mode,
an SFN data channel mode,
a non-SFN data channel mode,
an SFN DMRS mode,
a non-SFN DMRS mode,
a dynamic point switching mode,
a Doppler or delay pre-compensation mode,
a non-pre-compensation mode,
a single transmission configuration (TCI) state mode,
a multiple TCI states mode, or
a mode including two or more modes thereof.

17. The method of claim 14, wherein the first candidate transmission mode comprises a non-coherent joint transmission (NCJT) mode, and
wherein the indication of the preferred DMRS configuration is included in a corresponding CSI reporting comprising one or more channel state information (CSI) components that includes an indication of a preferred DMRS configuration for one or more reported CSI components corresponding to different CSI measurement resources and transmission mode hypotheses.

18. The method of claim 17, wherein the one of more reported CSI components correspond to one or more of multi-TRP hypotheses or single TRP hypotheses.

19. The method of claim 14, wherein the indication of the preferred DMRS configuration is included in a report of channel state information (CSI) components and indicates the preferred DMRS configuration, from a set of candidate DMRS configurations, for a CSI component associated with a multi-TRP hypothesis, and
wherein the preferred DMRS configuration is based at least in part on a multi-TRP transmission mode associated with the CSI component.

20. The method of claim 14, wherein the indication of the preferred DMRS configuration and the additional DMRS configuration is included in a report of channel state information (CSI) components and indicates the preferred DMRS configuration and the additional DMRS configuration, from a set of candidate DMRS configurations, for a CSI component corresponding to a multi-TRP hypothesis, and
wherein the preferred DMRS configuration is associated with a first TRP that is associated with the multi-TRP hypothesis and the additional DMRS configuration is associated with a second TRP that is associated with the multi-TRP hypothesis.

21. The method of claim 14, further comprising:
transmitting an indication of a configuration for transmitting the indication of the preferred DMRS configuration.

22. The method of claim 14, further comprising:
transmitting an indication of a transmission mode to be used to determine the preferred DMRS configuration to be used for the downlink communication using the indicated transmission mode,
wherein the preferred DMRS configuration to be used for the downlink communication is based at least in part on the indicated transmission mode.

23. The method of claim 14, further comprising:
transmitting an indication of a first candidate transmission mode and a second candidate transmission mode to be used to determine the preferred DMRS configuration to be used for the downlink communication; and
receiving an indication of a DMRS configuration preference for the first candidate transmission mode or the second candidate transmission mode,
wherein the preferred DMRS configuration to be used for the downlink communication is based at least in part on a UE-preferred hypothesis for using the first candidate transmission mode or the second candidate transmission mode.

24. The method of claim 14, further comprising:
transmitting an indication of candidate DMRS configurations associated with the first candidate transmission mode,
wherein the preferred DMRS configuration is one of the candidate DMRS configurations.

25. The method of claim 14, wherein receiving the indication of the preferred DMRS configuration comprises one or more of:
- receiving the indication of the preferred DMRS configuration via one or more of a periodic report, an aperiodic report, or a semi-persistent scheduled report, or
- receiving the indication of the preferred DMRS configuration via a two-step reporting procedure that includes a first portion indicating a request to change a current DMRS configuration for one or more associated transmission modes and a second portion that is triggered by the first portion and indicates the preferred DMRS configuration for the one or more associated transmission modes.

26. A user equipment (UE) for wireless communication, comprising:
- one or more memories; and
- one or more processors, coupled to the one or more memories, configured to:
  - receive, from a network entity associated with multiple transmission reception points (TRPs), one or more reference signals associated with a downlink communication; and
  - transmit an indication of a preferred demodulation reference signal (DMRS) configuration and an additional DMRS configuration to be used for the downlink communication, the preferred DMRS configuration and the additional DMRS configuration based at least in part on the one or more reference signals,
  - wherein the preferred DMRS configuration is based at least in part on a speed of the UE and a first candidate transmission mode from a set of multiple candidate transmission modes, the first candidate transmission mode associated with the preferred DMRS configuration,
  - wherein the additional DMRS configuration is based at least in part on a second candidate transmission mode, from the set of multiple candidate transmission modes, that is associated with the additional DMRS configuration, and
  - wherein the indication of the preferred DMRS configuration and the additional DMRS configuration to be used for the downlink communication is based at least in part on one or more of:
    - a Doppler spread or a time correlation characteristic, per TRP of the multiple TRPs, associated with the one or more reference signals,
    - a signal-to-noise ratio or a signal-to-interference-plus-noise ratio, per TRP of the multiple TRPs, associated with the one or more reference signals, or
    - an indication associated with Doppler spread or time correlation characteristic for DMRS ports for an associated multi-TRP transmission mode evaluated based at least in part on a transmission mode assumption and based at least in part on Doppler characteristics or time correlation measurements per TRP.

27. The UE of claim 26, wherein transmitting the indication of the preferred DMRS configuration and the additional DMRS configuration comprises transmitting the indication via one or more of:
- a channel state feedback (CSF) report, or
- a message coupled to or associated with the CSF report.

28. The UE of claim 26, wherein the set of multiple candidate transmission modes comprises one or more of:
- a single frequency network (SFN) mode,
- an SFN data channel mode,
- a non-SFN data channel mode,
- an SFN DMRS mode,
- a non-SFN DMRS mode,
- a dynamic point switching mode,
- a Doppler or delay pre-compensation mode,
- a non-pre-compensation mode,
- a single transmission configuration (TCI) state mode,
- a multiple TCI states mode, or
- a mode including two or more modes thereof.

29. A network entity for wireless communication, comprising:
- multiple transmission reception points (TRPs);
- one or more memories; and
- one or more processors, coupled to the one or more memories, configured to:
  - transmit one or more reference signals associated with a downlink communication; and
  - receive an indication of a preferred demodulation reference signal (DMRS) configuration and an additional DMRS configuration to be used for the downlink communication, the preferred DMRS configuration and the additional DMRS configuration based at least in part on the one or more reference signals,
  - wherein the preferred DMRS configuration is based at least in part on a speed of a user equipment (UE) and a first candidate transmission mode from a set of multiple candidate transmission modes, the first candidate transmission mode associated with the preferred DMRS configuration,
  - wherein the additional DMRS configuration is based at least in part on a second candidate transmission mode, from the set of multiple candidate transmission modes, that is associated with the additional DMRS configuration, and
  - wherein the indication of the preferred DMRS configuration and the additional DMRS configuration to be used for the downlink communication is based at least in part on one or more of:
    - a Doppler spread or a time correlation characteristic, per TRP of the multiple TRPs, associated with the one or more reference signals,
    - a signal-to-noise ratio or a signal-to-interference-plus-noise ratio, per TRP of the multiple TRPs, associated with the one or more reference signals, or
    - an indication associated with Doppler spread or time correlation characteristic for DMRS ports for an associated multi-TRP transmission mode evaluated based at least in part on a transmission mode assumption and based at least in part on Doppler characteristics or time correlation measurements per TRP.

30. The network entity of claim 29, wherein receiving the indication of the preferred DMRS configuration and the additional DMRS configuration comprises receiving the indication via one or more of:
- a channel state feedback (CSF) report, or
- a message coupled to or associated with the CSF report.

* * * * *